(12) United States Patent
Duan et al.

(10) Patent No.: US 10,920,741 B1
(45) Date of Patent: Feb. 16, 2021

(54) SUBMERSIBLE POWER GENERATING SYSTEM FOR GENERATING ELECTRICITY VIA TOTAL POTENTIAL ENERGY OF STILL WATER

(71) Applicants: Bingyuan Duan, Union City, NJ (US); Yun Long Duan, Kunming (CN)

(72) Inventors: Bingyuan Duan, Union City, NJ (US); Yun Long Duan, Kunming (CN)

( * ) Notice: Subject to any disclaimer, the term of this patent is extended or adjusted under 35 U.S.C. 154(b) by 0 days.

(21) Appl. No.: 16/748,519

(22) Filed: Jan. 21, 2020

(51) Int. Cl.
  *F03B 17/02* (2006.01)
  *F03B 13/26* (2006.01)

(52) U.S. Cl.
  CPC .......... *F03B 13/266* (2013.01); *F03B 13/264* (2013.01)

(58) Field of Classification Search
  CPC ........ F03B 13/26; F03B 13/16; F03B 13/188; F03B 13/1885; F03B 13/20; F03B 15/00; F03B 13/24; F05B 2240/93; F05B 2260/4031; F05B 2220/706; F05B 2240/97; F05B 2280/5001; Y02E 10/38; Y02E 10/32
  See application file for complete search history.

(56) References Cited

U.S. PATENT DOCUMENTS

| | | | | |
|---|---|---|---|---|
| 6,051,891 | A * | 4/2000 | Surodin | F01K 25/10 290/1 R |
| 6,817,180 | B2 * | 11/2004 | Newman | F03B 17/025 60/639 |
| 7,134,283 | B2 * | 11/2006 | Villalobos | F03G 7/10 60/639 |
| 8,171,729 | B2 * | 5/2012 | O'Briant | F03B 17/04 60/495 |
| 9,878,873 | B2 * | 1/2018 | Gordon | F03G 5/06 |
| 10,364,791 | B2 | 7/2019 | Mcclary | |
| 10,541,428 | B2 | 1/2020 | Kao | |
| 10,641,238 | B2 | 5/2020 | Suzuki | |
| 10,665,869 | B2 | 5/2020 | Liaw | |
| 10,731,623 | B2 | 8/2020 | Ishida et al. | |
| 2009/0309373 | A1 * | 12/2009 | O'Briant | H02K 53/00 290/1 R |
| 2013/0200635 | A1 * | 8/2013 | Hopper | A01G 33/00 290/1 R |

FOREIGN PATENT DOCUMENTS

WO   WO-2017107502 A1 *   6/2017   .............. F03B 17/02

OTHER PUBLICATIONS

WO 2017/107502A1 English Translation (Year: 2017).*

* cited by examiner

*Primary Examiner* — Shafiq Mian

(57) ABSTRACT

A submersible power generating system for generating electricity from total potential energy of still water has a closed endless rotation cascade cage apparatus, a compressed air generating apparatus, a compressed air storage apparatus, a gas injection apparatus, a gas retrieving apparatus, a building, an initiation power supply apparatus, a power generating apparatus, an intelligent control apparatus, a safety apparatus, a water treatment apparatus and a maintenance facility. The submersible power generating system makes full use of natural properties of water and air, performs continuous energy conversion, and achieves energy balance in three stages, so as to directly converse total potential energy of still water into electric energy, thereby achieving stable power production and obtaining inexhaustible and clean electric energy.

19 Claims, 33 Drawing Sheets

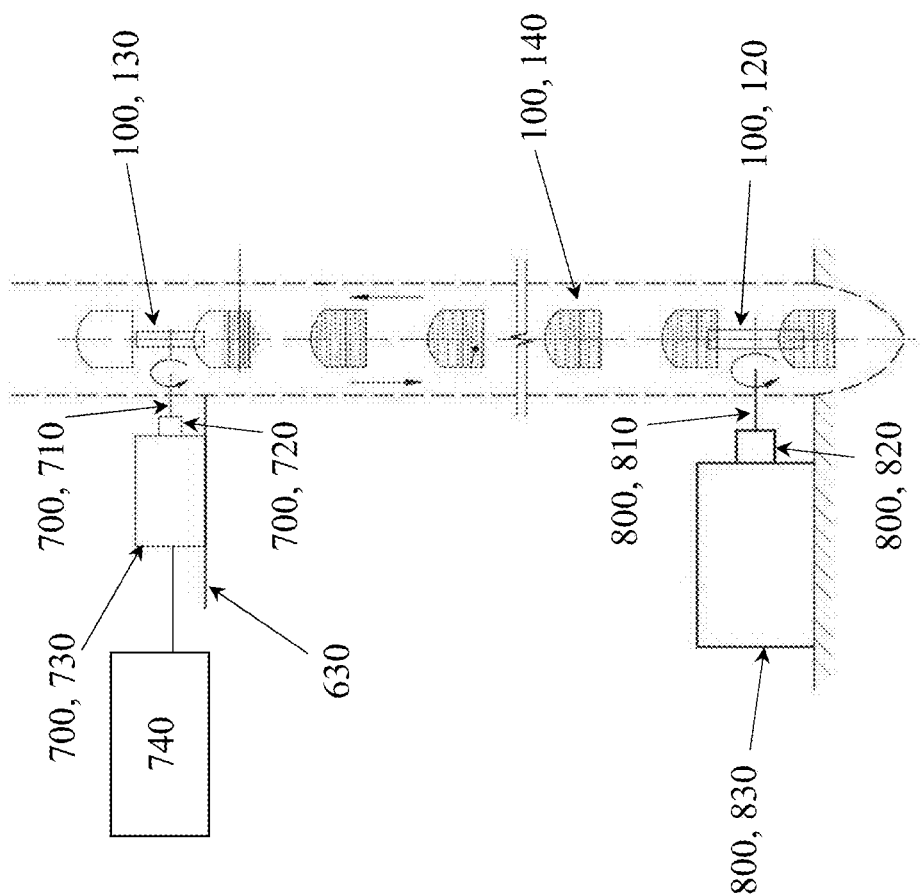

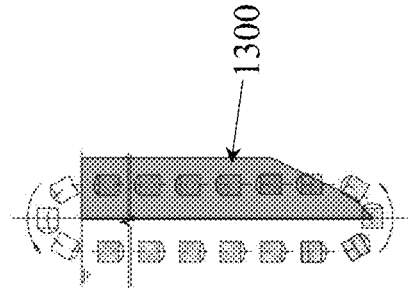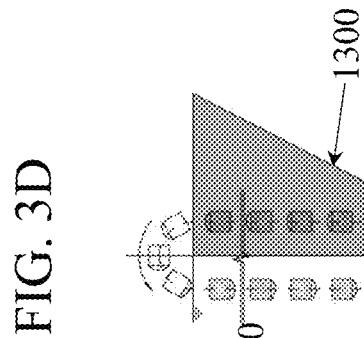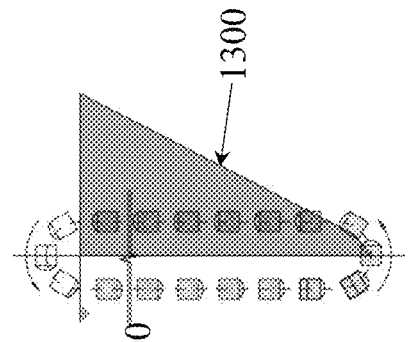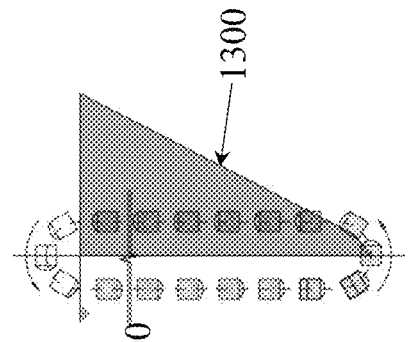
FIG. 3A  FIG. 3B  FIG. 3C  FIG. 3D
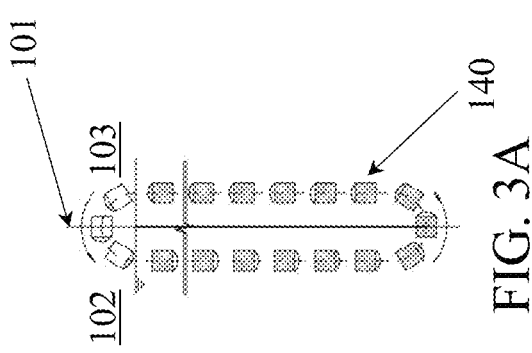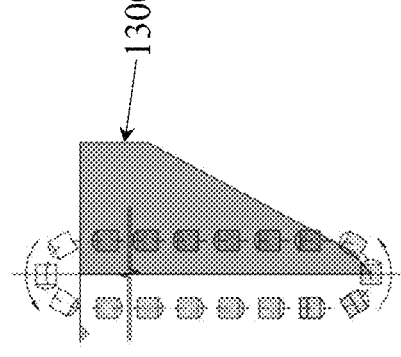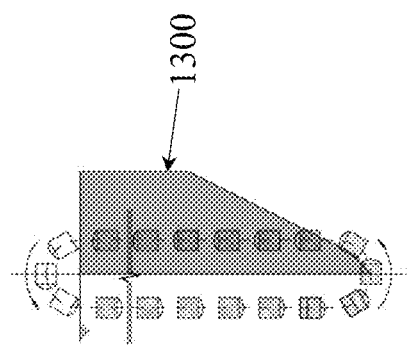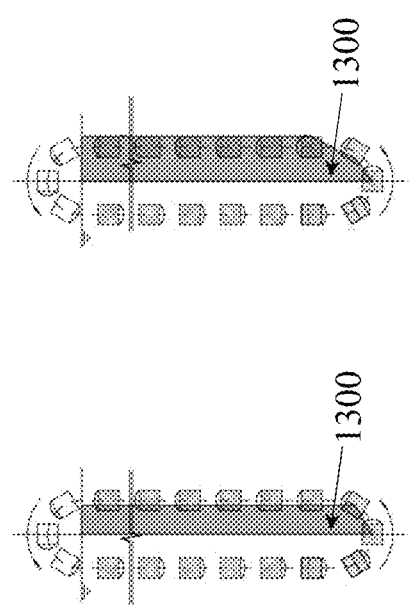
FIG. 3E  FIG. 3F  FIG. 3G  FIG. 3H

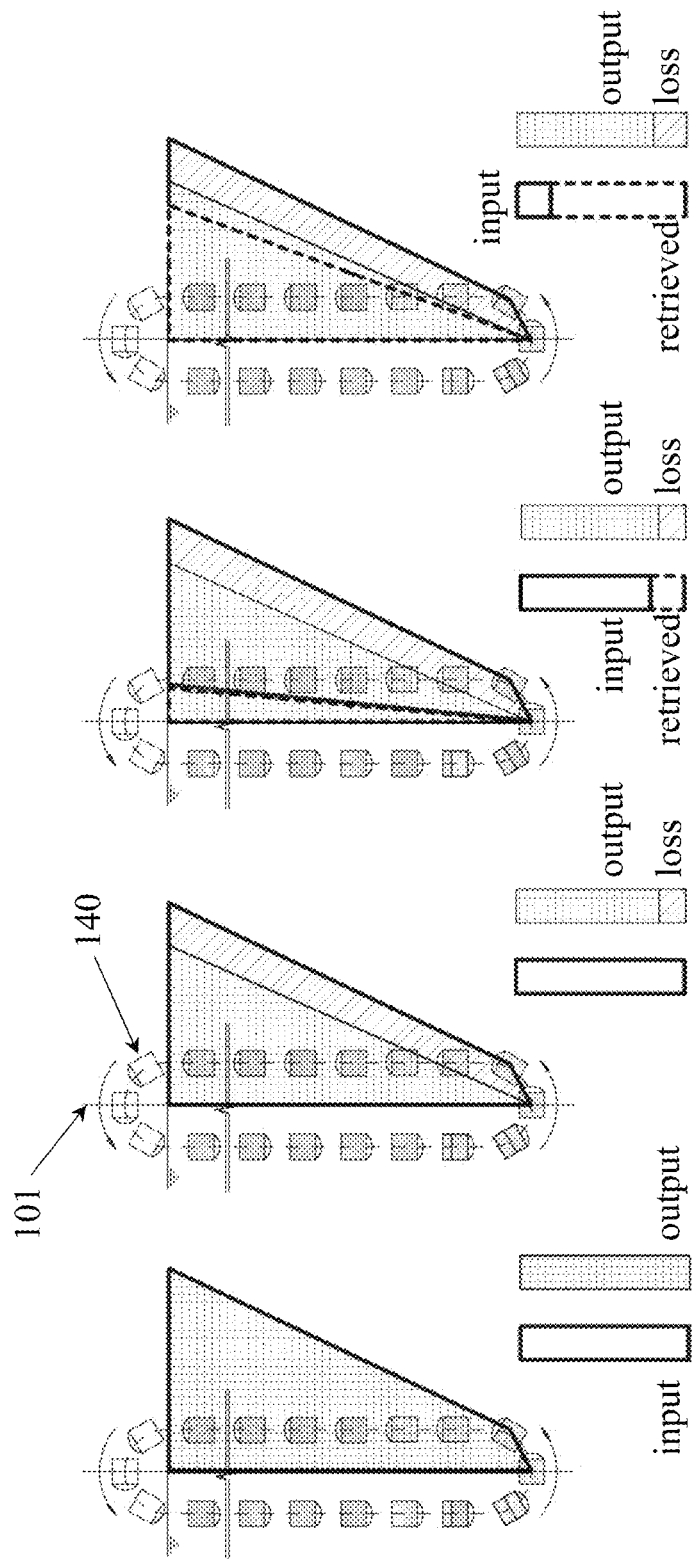

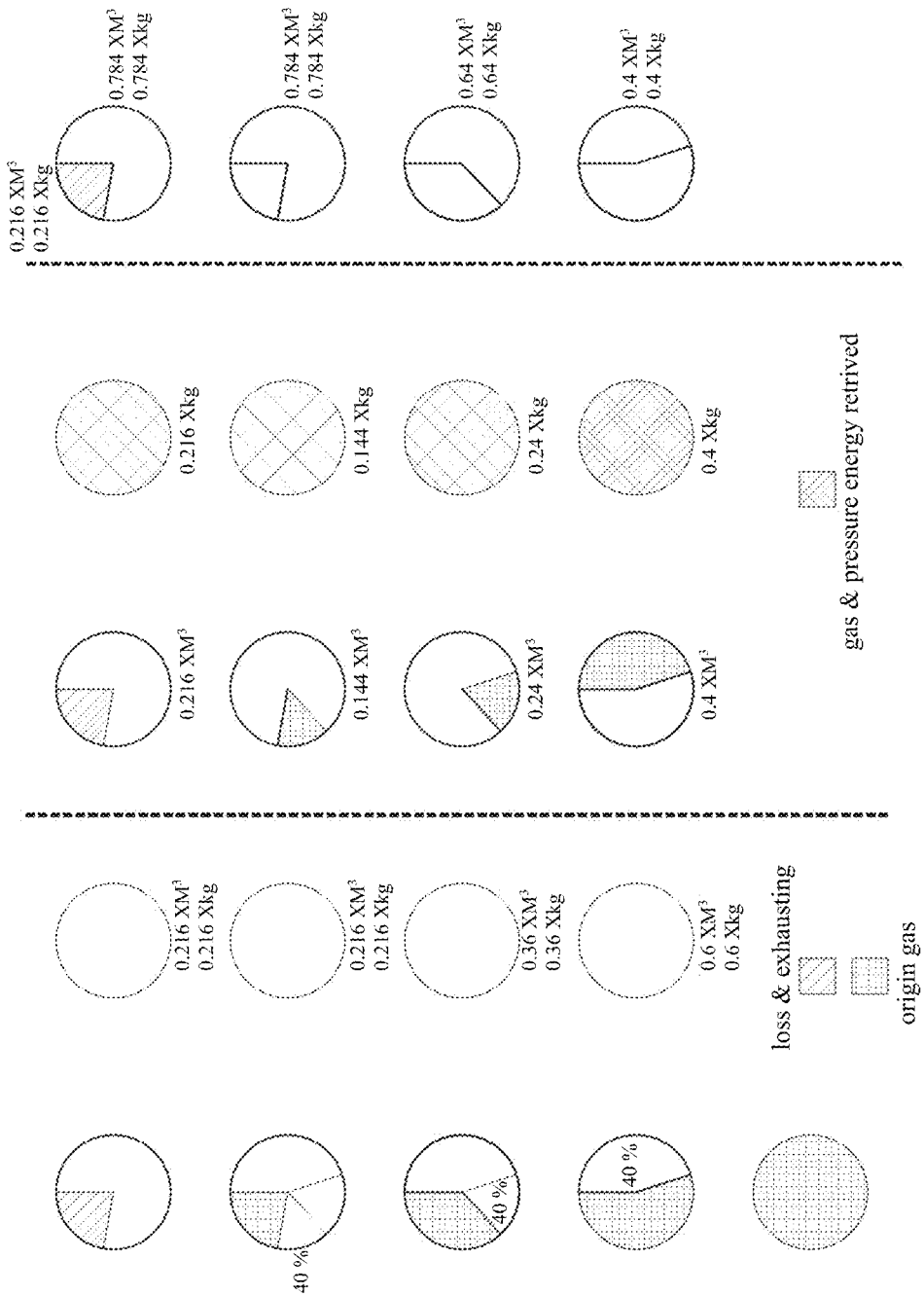

SUBMERSIBLE POWER GENERATING SYSTEM FOR GENERATING ELECTRICITY VIA TOTAL POTENTIAL ENERGY OF STILL WATER

FIELD OF THE INVENTION

The present invention relates generally to a new power generating system. More particularly, the present invention is a submersible power generating system for generating electricity via total potential energy of still water in the natural world.

BACKGROUND OF THE INVENTION

As the global economy develops, the demand for energy will increase. However, the worldwide energy shortage has already had a serious impact on the rapid economic development. The depletion of fossil energy has pose a serious challenge to human beings. Since energy is the foundation of life, human beings must completely solve the problem of energy shortage to survive and develop. With the advancement of science and technology in the 21st century, solar energy, wind energy, tidal energy, bioenergy, geothermal energy, dry stone heat, deep sea combustible ice, magnetic energy, nuclear energy, artificial sun, quantum energy and proton energy have been paid more and more attention by people, and most of them have been put into development and utilization. However, there are many problems during the development and utilization progress, such as enormous investment, considerable floor space requirement, extreme pollution, high cost, low efficiency, highly requirement of technology, or far away from being put into actual application. For these reasons, the challenges and crises caused by energy shortage to human beings have not been completely solved so far, and people's worries about future survival have not been completely eliminated. As shown in FIG. 1, in a conventional hydropower generating system, a water body must have fluidity, the water body must be located above a generator, a turbine is pushed by the water body and then is in rotation state when the water body flows downwards, then kinetic energy is converted into mechanical energy, and the generator is driven by the mechanical energy so as to produce electricity. However, during the power generating process, after the water body flows to the turbine and energy transfer is achieved by the generator, the water body would then flow to other places and thus cannot be used to generate power anymore.

SUMMARY OF THE INVENTION

It is therefore an objective of the present invention to resolve at least the above problems by providing a submersible power generating system for generating electricity via total potential energy of still water in the natural world. The present invention makes full use of natural properties of water and air, performs continuous energy conversion, and achieves energy balance in three stages, so as to directly converse total potential energy of still water into electric energy, thereby achieving stable power production and obtaining inexhaustible and clean electric energy. In the present invention, the submersible power generating system for generating electricity from total potential energy of still water comprises a closed endless rotation cascade cage apparatus, a compressed air generating apparatus, a compressed air storage apparatus, a gas injection apparatus, a gas retrieving apparatus, a building, an initiation power supply apparatus, a power generating apparatus, an intelligent control apparatus, a safety apparatus, a water treatment apparatus and a maintenance facility. The core technology of the present invention is that most of the energy input is always in the state of being recycled and reused and the retrieved energy is incrementally increased, so as to completely change the composition of the energy input, and ultimately to ensure continuous power production by the energy input always less than the energy output via total potential energy of still water.

BRIEF DESCRIPTION OF THE DRAWINGS

FIG. 2 is a schematic diagram showing an arrangement of parts and an operation of a submersible power generating system according to the present invention;

FIG. 3A is a schematic diagram showing an operation of the submersible power generating system obtaining buoyancy force and generating kinetic energy according to the present invention;

FIG. 3B is a schematic diagram showing the operation of the submersible power generating system obtaining buoyancy force and generating kinetic energy according to the present invention;

FIG. 3C is a schematic diagram showing the operation of the submersible power generating system obtaining buoyancy force and generating kinetic energy according to the present invention;

FIG. 3D is a schematic diagram showing the operation of the submersible power generating system obtaining buoyancy force and generating kinetic energy according to the present invention;

FIG. 3E is a schematic diagram showing the operation of the submersible power generating system obtaining buoyancy force and generating kinetic energy according to the present invention;

FIG. 3F is a schematic diagram showing the operation of the submersible power generating system obtaining buoyancy force and generating kinetic energy according to the present invention;

FIG. 3G is a schematic diagram showing the operation of the submersible power generating system obtaining buoyancy force and generating kinetic energy according to the present invention;

FIG. 3H is a schematic diagram showing the operation of the submersible power generating system obtaining buoyancy force and generating kinetic energy according to the present invention;

FIG. 4A is a schematic diagram showing the submersible power generating system consuming energy and generating new energy according to the present invention;

FIG. 4B is a schematic diagram showing the submersible power generating system consuming energy and generating new energy according to the present invention;

FIG. 4C is a schematic diagram showing the submersible power generating system consuming energy and generating new energy according to the present invention;

FIG. 4D is a schematic diagram showing the submersible power generating system consuming energy and generating new energy according to the present invention;

FIG. 5A is a schematic diagram showing the submersible power generating system achieving reorganization of incrementally increased energy input via retrieving compressed air and pressure energy according to the present invention;

FIG. 5B is a schematic diagram showing the submersible power generating system achieving reorganization of incrementally increased energy input via retrieving compressed air and pressure energy according to the present invention;

FIG. 5C is a schematic diagram showing the submersible power generating system achieving reorganization of incrementally increased energy input via retrieving compressed air and pressure energy according to the present invention;

DETAIL DESCRIPTIONS OF THE INVENTION

Figure 1:
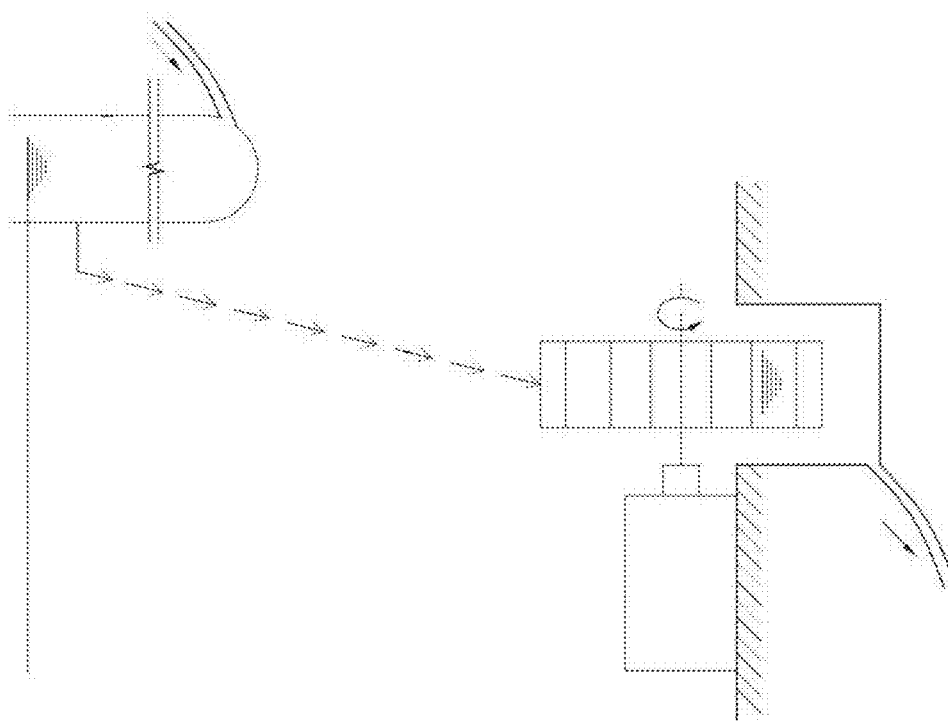
FIG. 1 is an arrangement of parts and an operation of a conventional hydropower generating system.

All illustrations of the drawings are for the purpose of describing selected versions of the present invention and are not intended to limit the scope of the present invention.

The natural property of water is that the surface of water is at atmospheric pressure, and there is a pressure difference relative to different water depths. Therefore, there must be kinetic energy due to the pressure difference. The greater the water depth is, the greater the pressure difference is, in other words, the greater the total potential energy is. The natural property of air is that air is highly compressible, and is easy to be stored in pressure vessels or to be transported through pipelines. Therefore, compressed air is the best carrier for transferring energy. In the present invention, a submersible power generating system uses raw materials, merely water and air, to activate the operation by investing an initial low energy as a key or an initiation, converts potential energy into kinetic energy, and achieves electricity production via three stages of energy balance. Based on energy balance principle and leverage principle, compressed air and pressure energy are recycled and reused, such that in the energy input (initial energy and retrieved energy), the retrieved energy is increased while the initial energy is decreased reratively. An energy input and an energy output are thus balanced, and the production operation is achieved upon the energy balance is maintained, and finally sustainable power production is achieved (as shown in FIGS. 4A-4D and 5A-5C). However, at a first stage of the production operation, based on the first law of energy balance, the energy input must be greater than the energy output, such that there will be no industrial applicability in the production operation. Thereafter, at a second stage of the production operation, based on the second law of energy balance, compressed air is retrieved via the expansion function of "entropy," so that pressure energy can be recycled and reused, and thus the composition of the energy input is reorganized by the energy input being incremented. Accordingly, the loss during the energy balance process is remedied by the newly created method of energy supplement. The so called third type of energy balance is a whole new balance law. During the movement of a substance along a certain orbit, once a portion of the energy of the substance is re-accumulated and looped, it could achieve a key to activate the potential of other substances by initially consuming less energy, so as to achieve goals of obtaining more energy. The energy needed for obtaining new substances is from the potential of the substances. In addition, the more times it is recycled, the more released potential energy is. This highlights the leverage principle in achieving the new third type of energy balance. In the third type of energy balance, with the continuation of the cycle of retrieving pressure energy, more retrieved energy is used to produce power. This is based on the leverage principle. Accordingly, during the production operation of power generating system, the initial energy input is forever and always less than the total new energy output (as shown in FIGS. 2, 3A-3H, 4A-4D, and 5A-5C).

Figure 6:
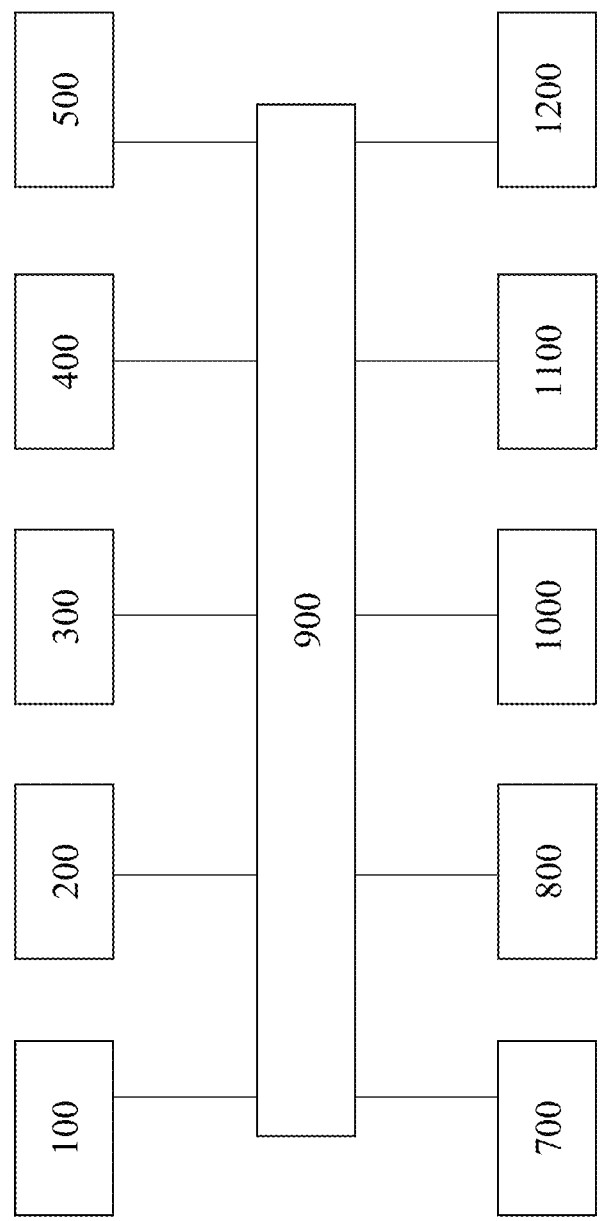
FIG. 6 is a schematic diagram showing an arrangement of other parts of the submersible power generating system according to the present invention.

In reference to FIGS. 2-33, the submersible power generating system for generating electricity from total potential energy of still water comprises a closed endless rotation cascade cage apparatus 100, a compressed air generating apparatus 200, a compressed air storage apparatus 300, a gas injection apparatus 400, a gas retrieving apparatus 500, a building 600, an initiation power supply apparatus 700, a power generating apparatus 800, an intelligent control apparatus 900, a safety apparatus 1000, a water treatment apparatus 1100 and a maintenance facility 1200 (especially as shown in FIG. 6).

Figure 8:
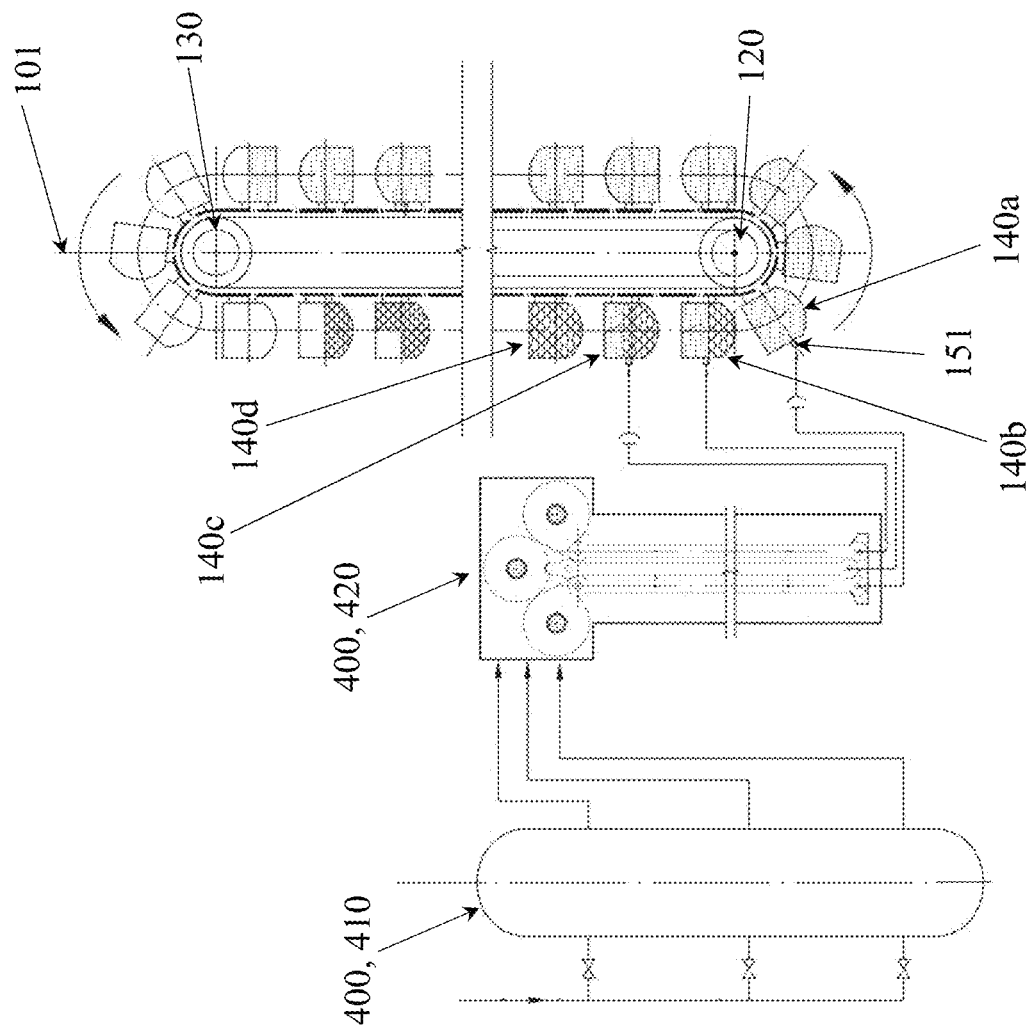
FIG. 8 is a schematic diagram showing the submersible power generating system performing a process of gas injection according to the present invention.
Figure 9:
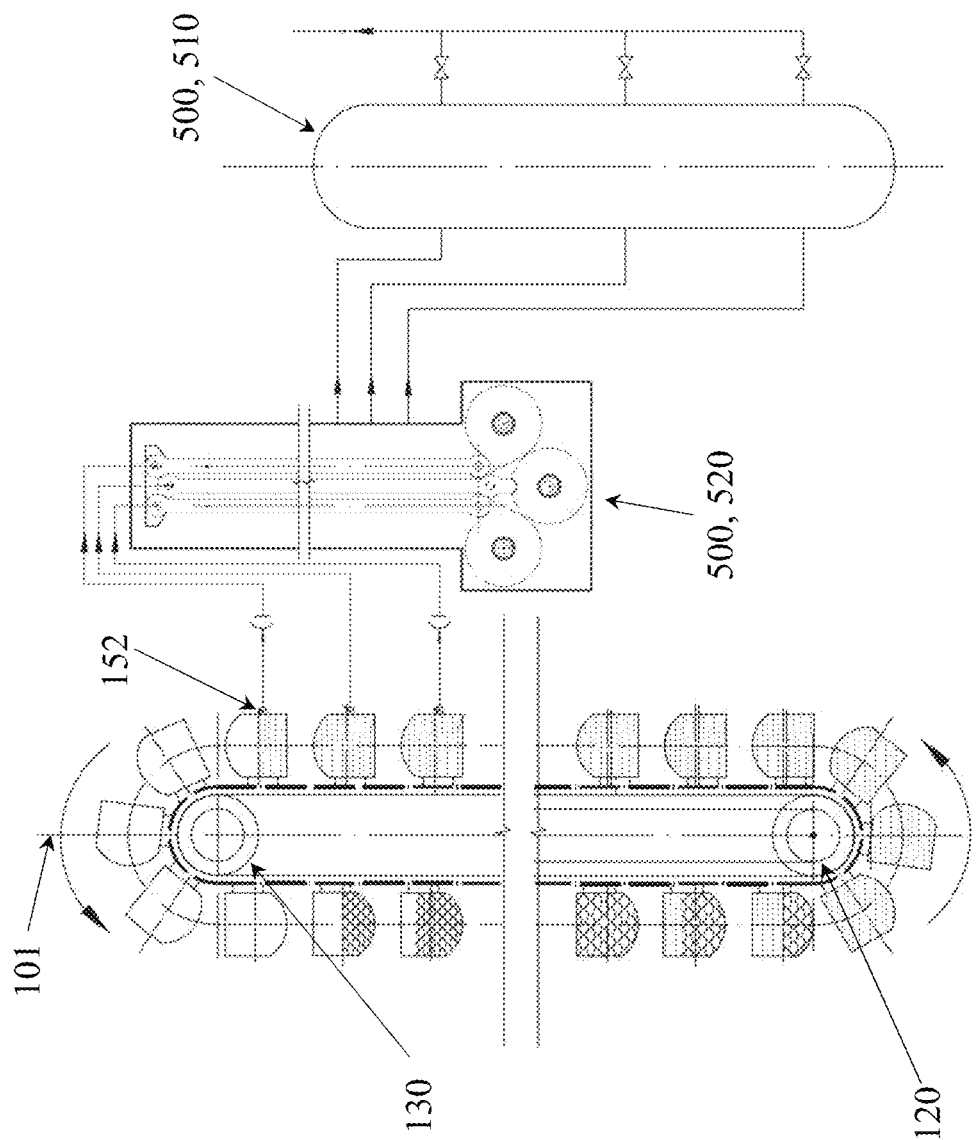
FIG. 9 is a schematic diagram showing the submersible power generating system performing a process of gas retrieving according to the present invention.
Figure 10:
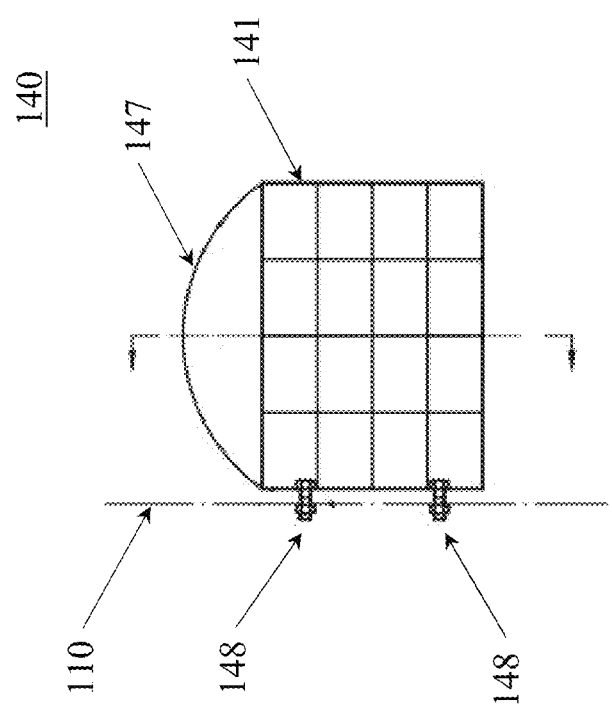
FIG. 10 is a front view showing a cage device connected with an endless tethering chain device according to the present invention.
Figure 11:
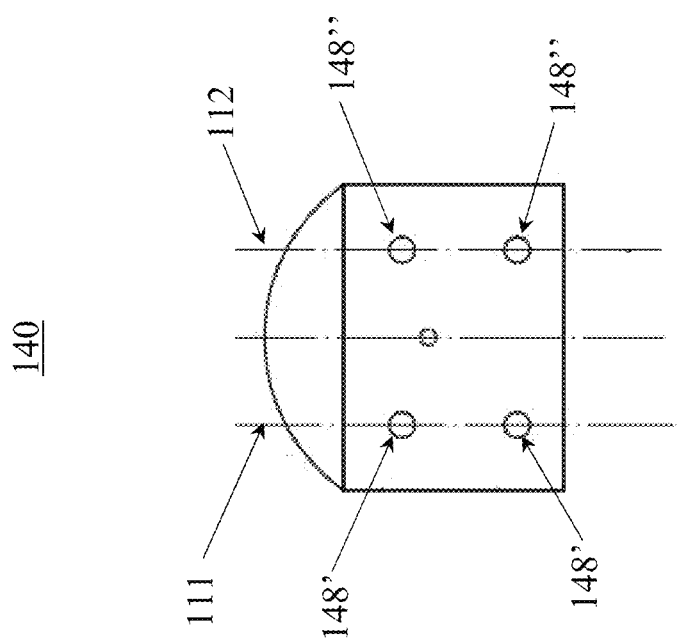
FIG. 11 is a side view showing the cage device connected with the endless tethering chain device according to the present invention.
Figure 12:
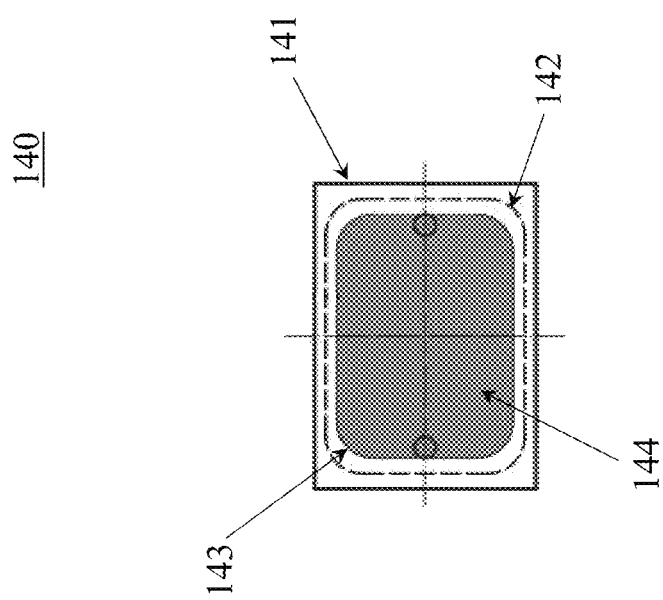
FIG. 12 is a bottom view showing the cage device according to the present invention.
Figure 13:
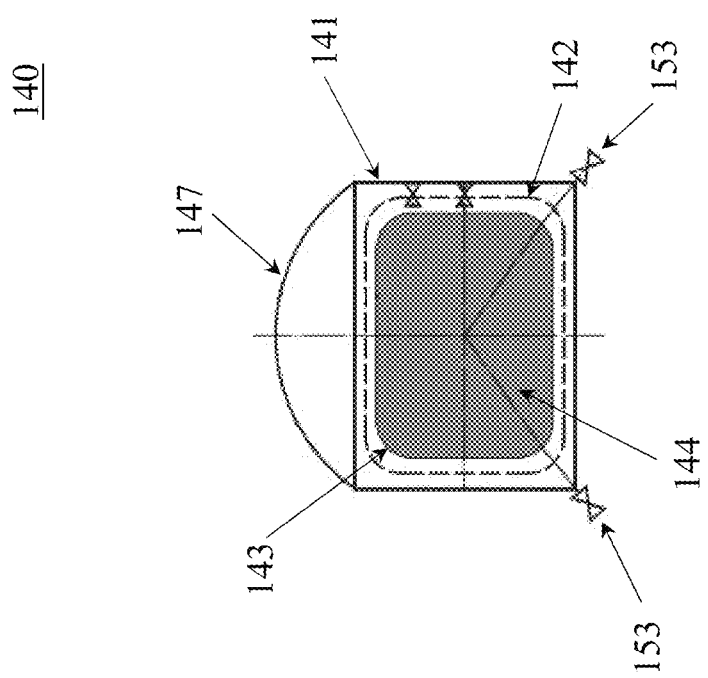
FIG. 13 is another side view showing the cage device according to the present invention.
Figure 14:
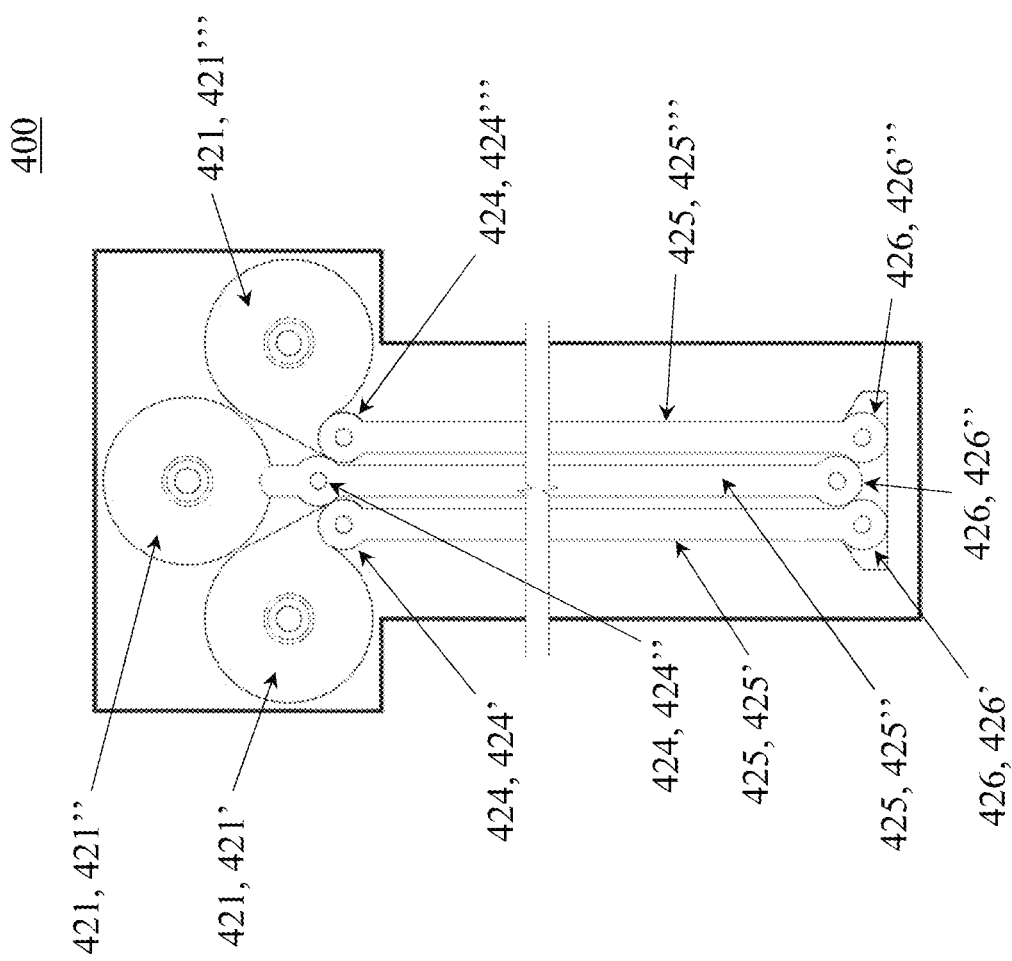
FIG. 14 is a front view showing parts of a gas injection device according to the present invention.
Figure 15:
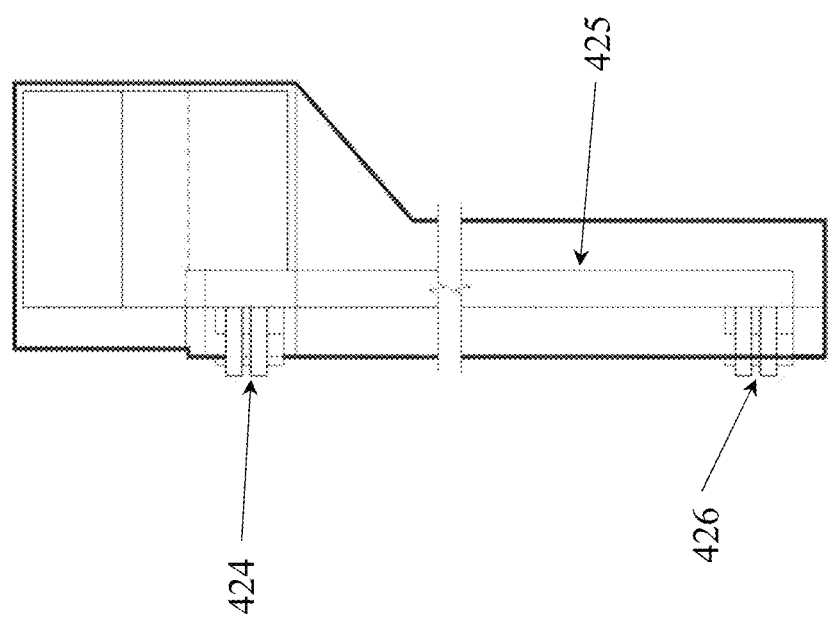
FIG. 15 is a side view showing parts of the gas injection device according to the present invention.
Figure 16:
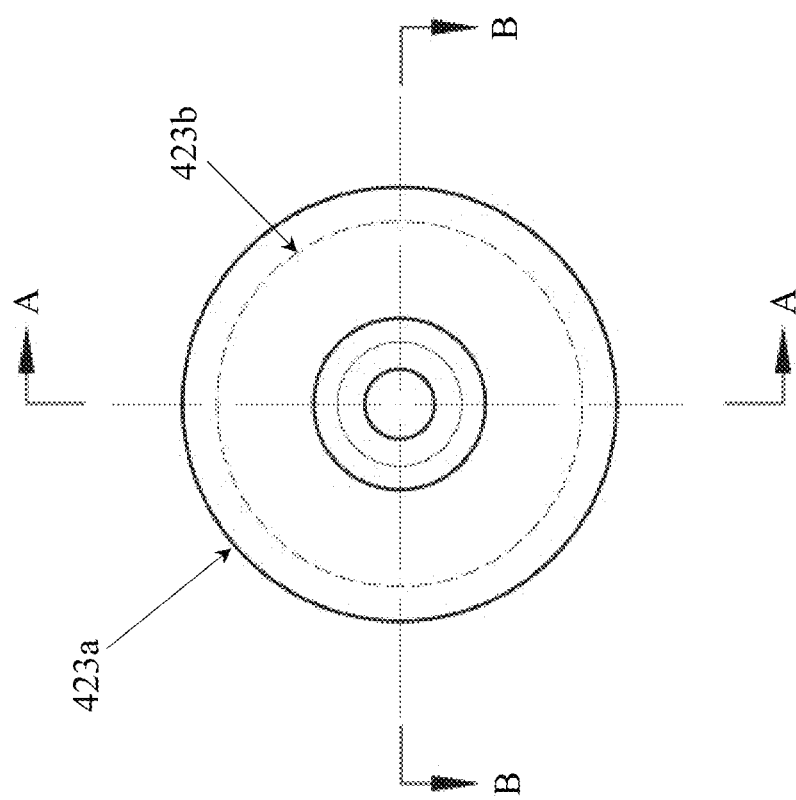
FIG. 16 is a top view showing other parts of the gas injection device according to the present invention.
Figure 17:
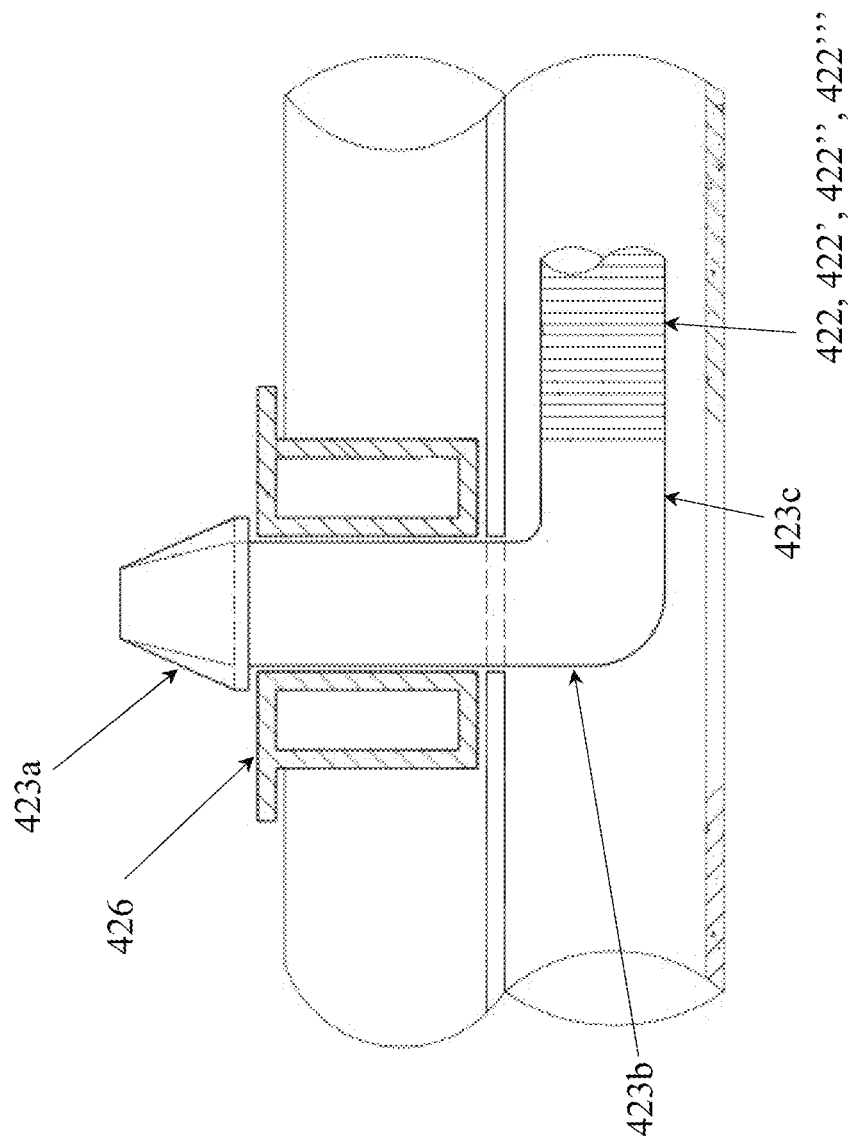
FIG. 17 is a cross-sectional view along line A-A of FIG. 16.
Figure 18:
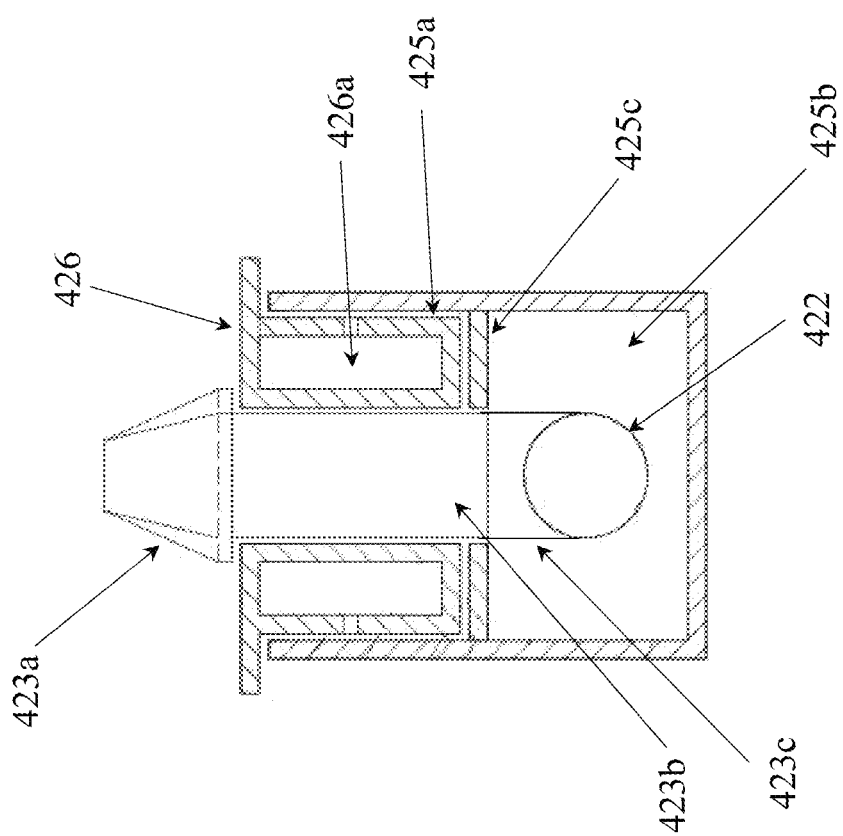
FIG. 18 is a cross-sectional view along line B-B of FIG. 16.
Figure 19:
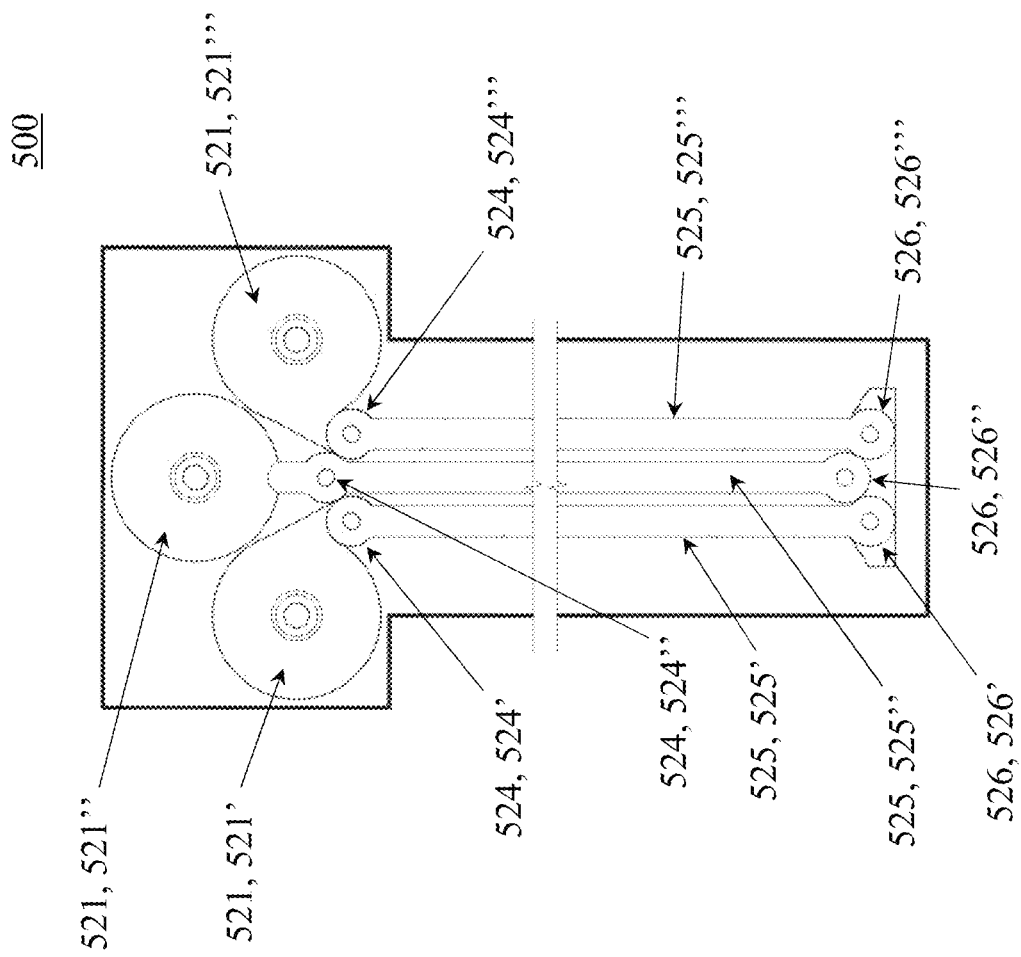
FIG. 19 is a front view showing parts of a gas retrieving device according to the present invention.
Figure 20:
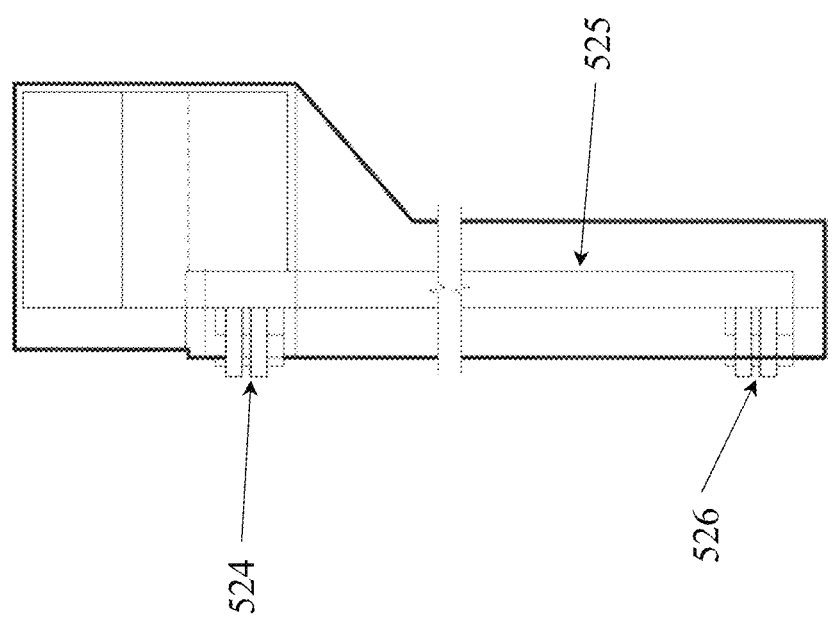
FIG. 20 is a side view showing parts of the gas retrieving device according to the present invention.
Figure 21:
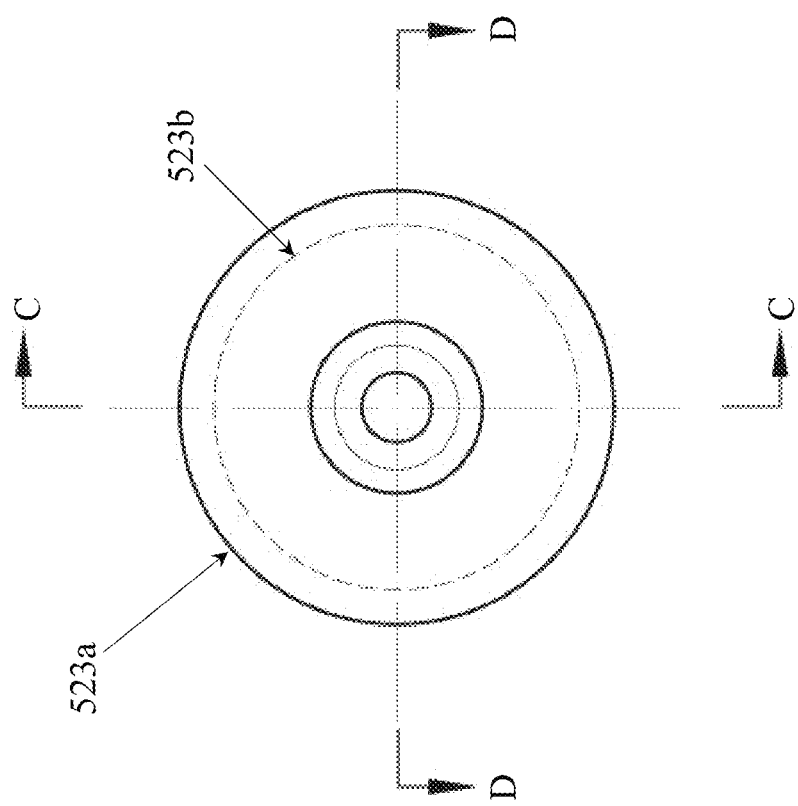
FIG. 21 is a top view showing other parts of the gas retrieving device according to the present invention.
Figure 22:
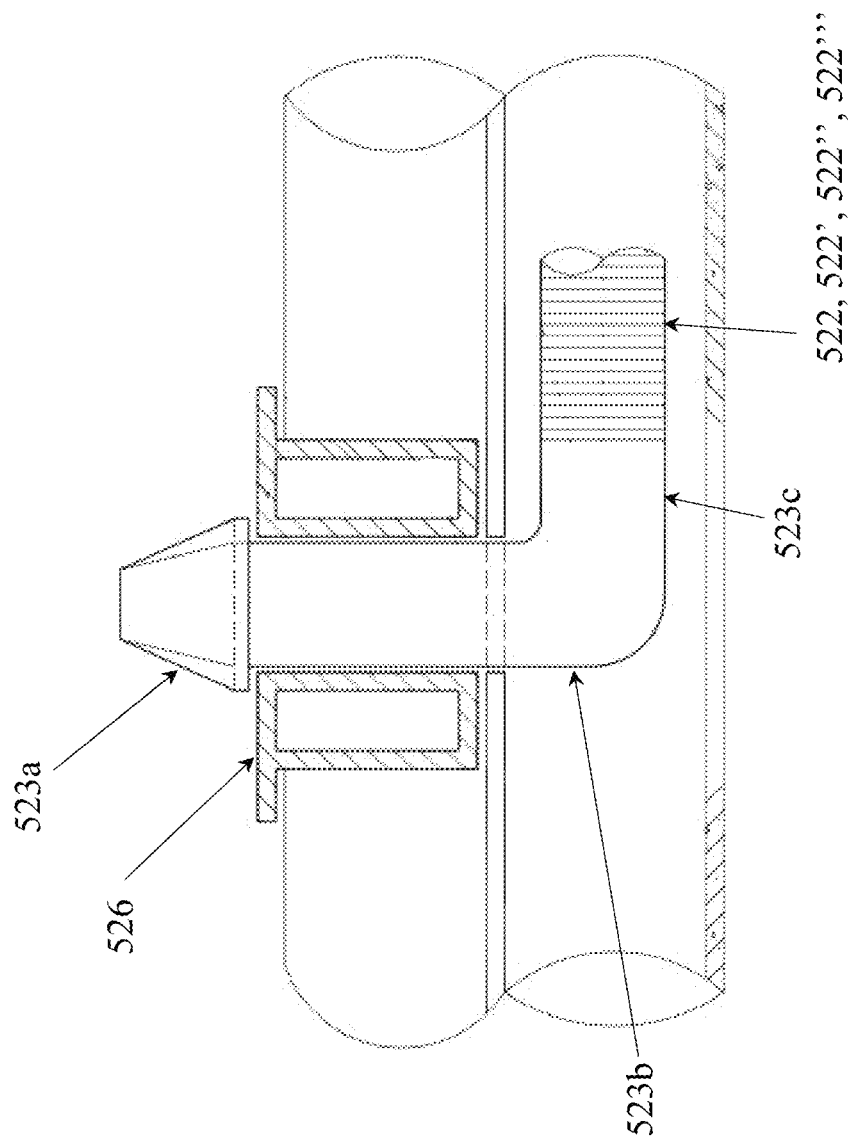
FIG. 22 is a cross-sectional view along line C-C of FIG. 21.
Figure 23:
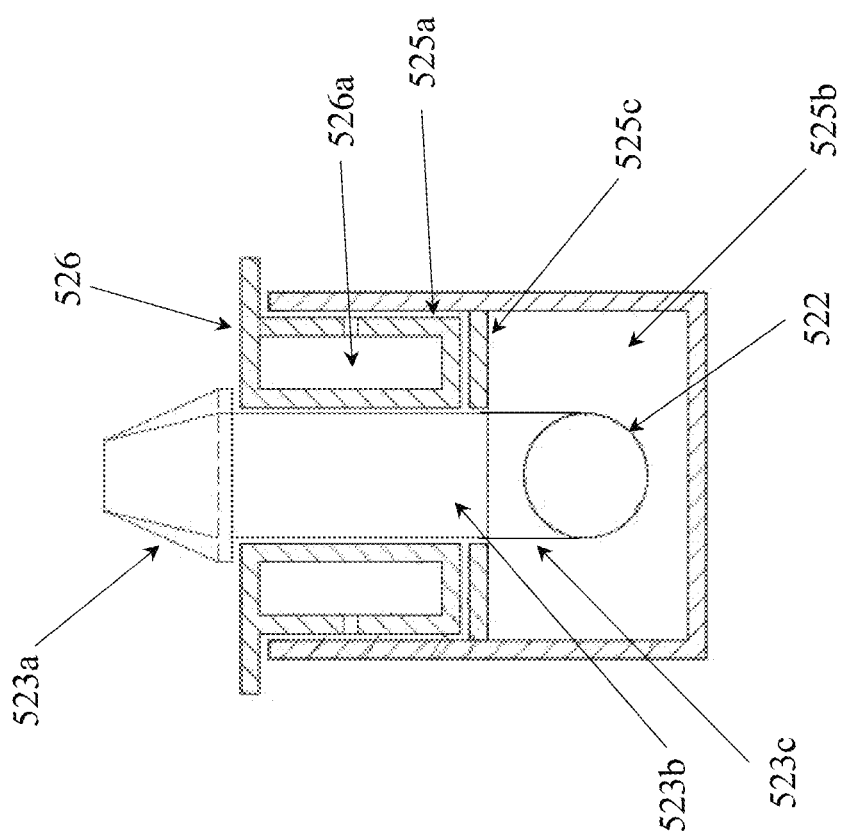
FIG. 23 is a cross-sectional view along line D-D of FIG. 21.
Figure 24:
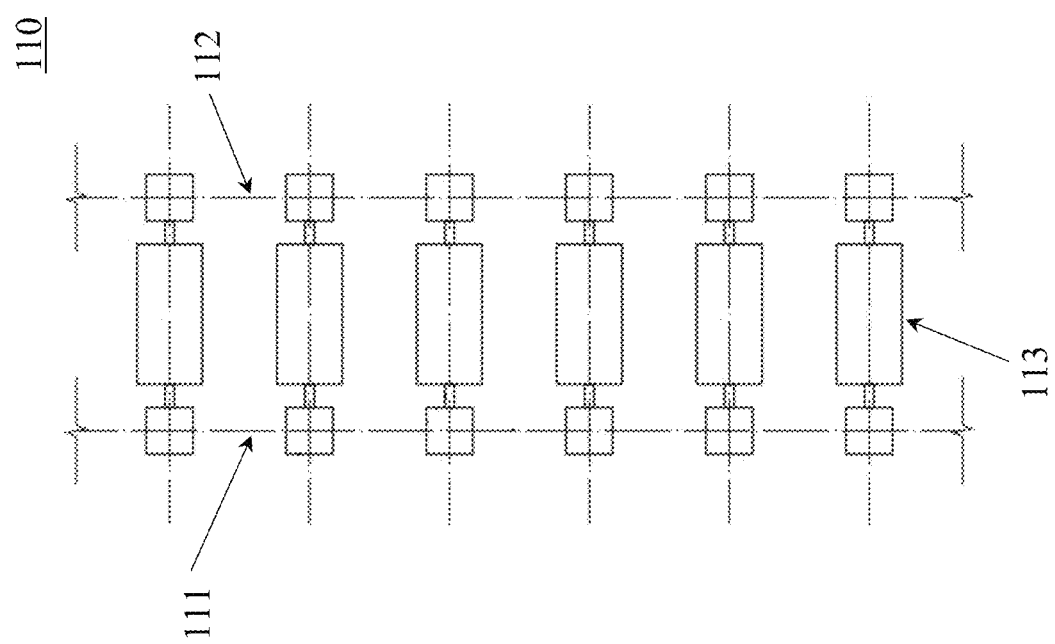
FIG. 24 is a side view showing an embodiment of the endless tethering chain device according to the present invention.
Figure 25:
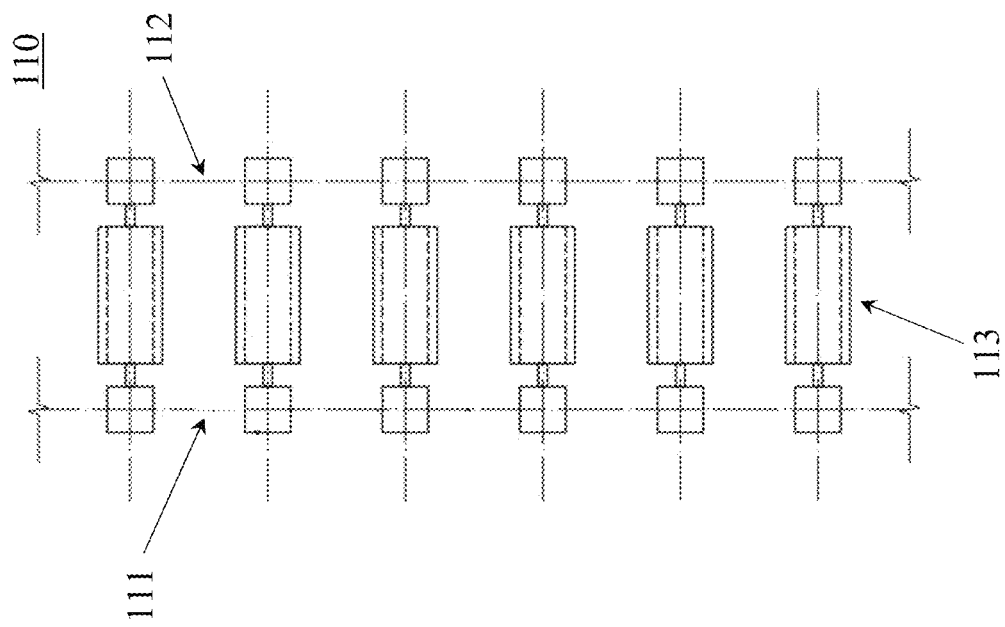
FIG. 25 is a side view showing another embodiment of the endless tethering chain device according to the present invention.
Figure 26:
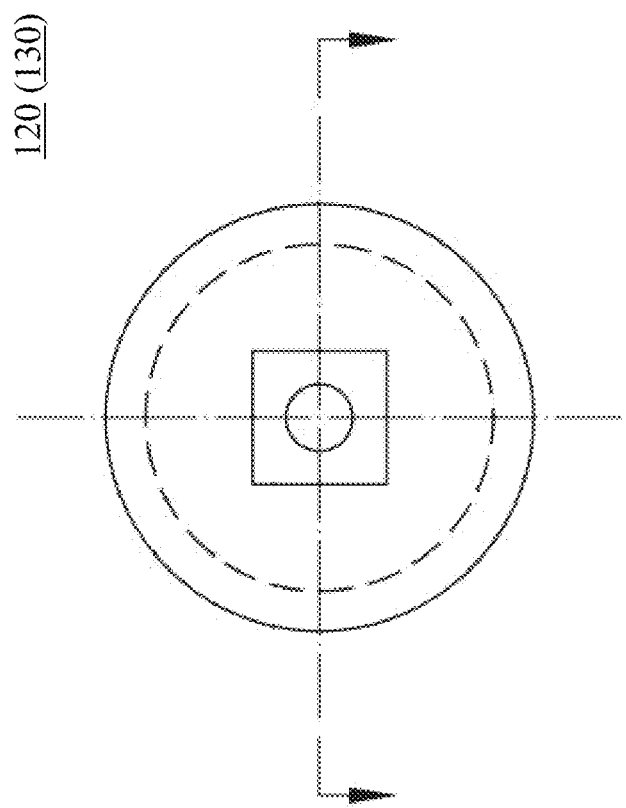
FIG. 26 is a front view showing parts of the endless tethering chain device according to the present invention.
Figure 27:
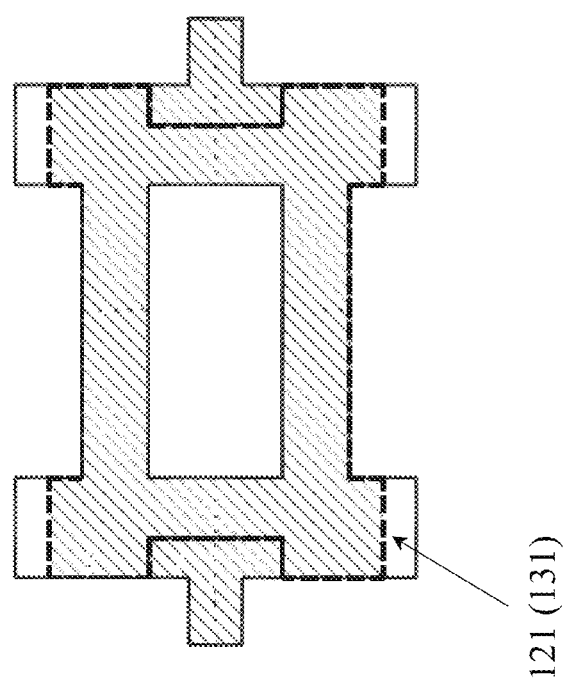
FIG. 27 is a cross-sectional view along line of FIG. 26.

As shown in FIGS. 8-9, the closed endless rotation cascade cage apparatus 100 comprises a sagittal plane 101, a gas injection region 102, a gas retrieving region 103, an endless tethering chain device 110, a driving gear 120, a driven gear 130 and a plurality of cage devices 140. The gas injection region 102 and the gas retrieving region 103 are divided by the sagittal plane 101. The endless tethering chain device 110 extends along the sagittal plane 101. The endless tethering chain device 110 is distributed in the gas injection region 102 and the gas retrieving region 103. The driving gear 120 is positioned on the sagittal plane 101. The driven gear 130 is positioned on the sagittal plane 101. The endless tethering chain device 110 is rotatably connected in between the driving gear 120 and the driven gear 130. A lower portion of the endless tethering chain device 110 is connected with the driving gear 120. An upper portion of the endless tethering chain device 110 is connected with the driven gear 130. The plurality of cage devices 140 are connected with the endless tethering chain device 110 in series. The plurality of cage devices 140 circulate in the gas injection region 102 and the gas retrieving region 103 when the endless tethering chain device 110 is rotated in between the driving gear 120 and the driven gear 130. As shown in FIGS. 10-13, each of the plurality of cage devices 140 comprises an external cage 141, an intermediate cage 142, an internal cage 143, an airbag 144, a gas injection receiver 145, a first gas injection valve 151, a gas retrieving receiver 146, a first gas retrieving valve 152, a gas release valve 153, a cover 147 and a connector 148. The intermediate cage 142 is accommodated within the external cage 141. The internal cage 143 is accommodated within the intermediate cage 142. The airbag 144 is accommodated within the internal cage 143. The external cage 141, the intermediate cage 142 and the internal cage 143 are used to prevent the airbag 144 from bursting due to over-inflation. The gas injection receiver 145 is connected with the airbag 144. The gas injection receiver 145 is in gaseous communication with the airbag 144. The first gas injection valve 151 is disposed within the gas injection receiver 145. The gas retrieving receiver 146 is connected with the airbag 144. The gas retrieving receiver 146 is in gaseous communication with the airbag 144. The first gas retrieving valve 152 is disposed within the gas retrieving receiver 146. The gas release valve 153 is connected with the airbag 144. The gas release valve 153 is in gaseous communication with the airbag 144. The cover 147 is connected with the external cage 141. The gas release valve 153 and the cover 147 are oppositely located to each other. The connector 148 is connected with the external cage 141. The external cage 141 is connected with the endless tethering chain device 110 via the connector 148. In one embodiment, each of the plurality of cage devices 140 comprises two gas release valves 153, each of the two gas release valves 153 is connected with the airbag 144, each of the two gas release valves 153 is in gaseous communication with the airbag 144, and the two gas release valves 153 are oppositely located to the cover 147. Each of the external cage 141, the intermediate cage 142 and the internal cage 143 comprises a cage body, a cage chamber and a plurality of cage holes, the cage chamber is formed within the cage body, the plurality of cage holes traverse into the cage body, and the plurality of cage holes are communicated with the cage chamber. Each of the plurality of holes of the external cage 141 is larger than each of the plurality of holes of the intermediate cage 142. Each of the plurality of holes of the intermediate cage 142 is larger than each of the plurality of holes of the internal cage 143. The external cage 141 is made of aluminum alloy materials or engineering plastic materials. The intermediate cage 142 is made of stainless steel materials. The internal cage 143 is made of stainless steel materials. The airbag 144 is made of composite materials of carbon fiber and anti-hydrolysis rubber. The airbag 144, like the heart of the human body, must resist fatigue caused by repeated stretching and compression, ensuring long-lasting durability. The cover 147 has a streamline shape for reducing water resistance. The cover 147 is made of aluminum alloy materials. As shown in FIGS. 24-27, the endless tethering chain device 110 comprises a first tethering chain 111, a second tethering chain 112 and a plurality of rigid links 113. Each of the plurality of rigid links 113 is connected in between the first tethering chain 111 and the second tethering chain 112. Each of the plurality of rigid links 113 is configured to engaged with gear teeth 121 of the driving gear 120 and gear teeth 131 of the driven gear 130. Each of the plurality of rigid links 113 is, but not limited to, a cylindrical bearing (FIG. 24) or a tooth (FIG. 25). The connector 148 comprises at least one first connecting member 148' and at least one second connecting member 148", the at least one first connecting member 148' is connected in between the first tethering chain 111 and the cage body of the external cage 141, and the at least one second connecting member 148" is connected in between the second tethering chain 112 and the cage body of the external cage 141. In one embodiment, there are two first connecting members 148' and two second connecting members 148", the two first connecting members 148' are connected in between the first tethering chain 111 and the cage body of the external cage 141, and the two second connecting members 148" are connected in between the second tethering chain 112 and the cage body of the external cage 141. Each of the first tethering chain 111 and the second tethering chain 112 is made of steel materials.

Figure 7:
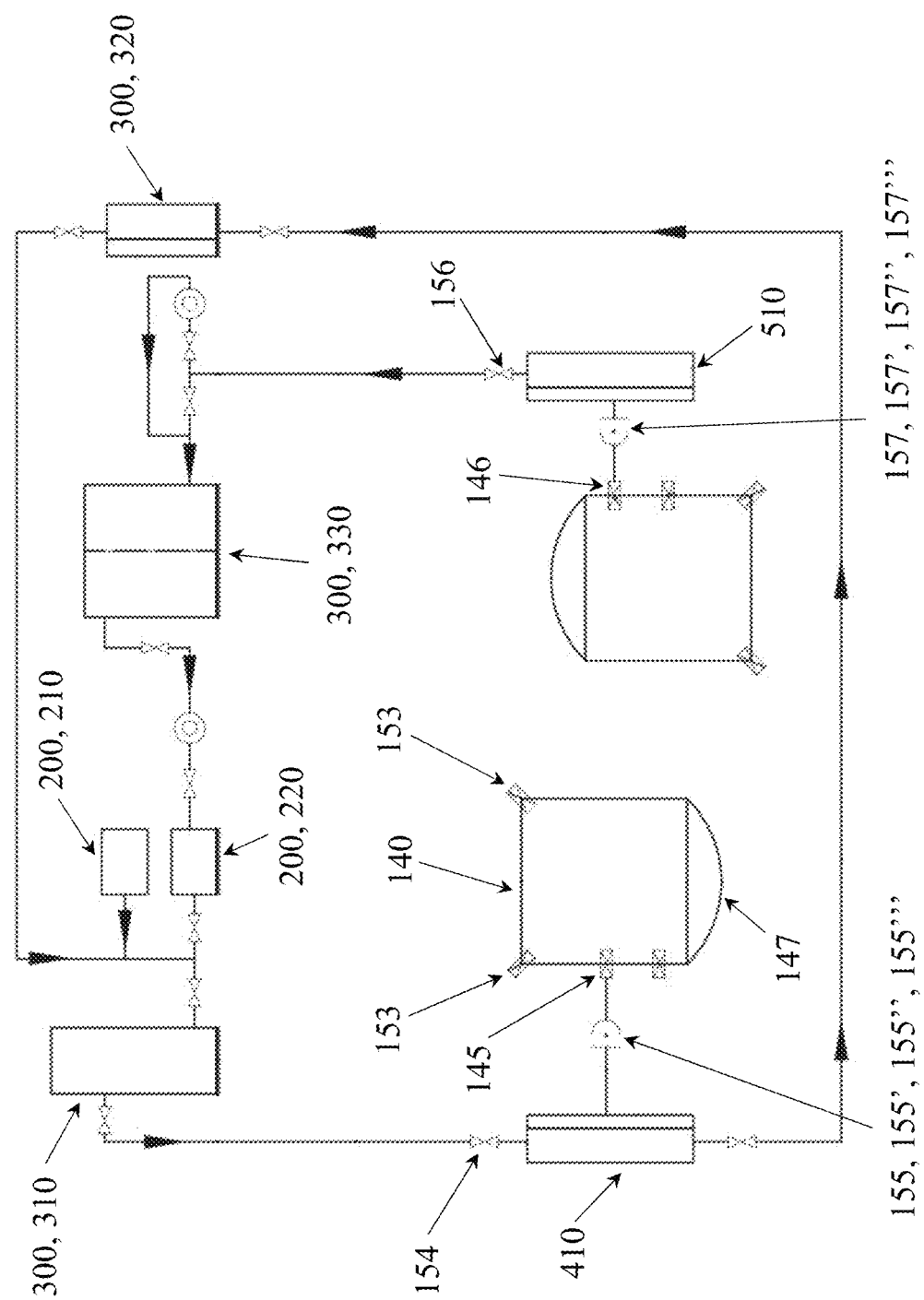
FIG. 7 is a schematic diagram showing an arrangement of another parts of the submersible power generating system according to the present invention.

As shown in FIG. 7, the compressed air generating apparatus 200 comprises a first compressed air generating device 210 and a second compressed air generating device 220. The first compressed air generating device 210 is configured to generate compressed air with a preset pressure from ambient air with an atmospheric pressure. The second compressed air generating device 220 is configured to generate compressed air with the preset pressure by raising a lower pressure of retrieved compressed air to the preset pressure. Accordingly, the first compressed air generating device 210 needs more electricity for generating compressed air with the preset pressure per unit ($M^3$), while the second compressed air generating device 220 needs less electricity for generating compressed air with the preset pressure per unit ($M^3$).

As shown in FIG. 7, the compressed air storage apparatus 300 comprises a compressed air storage tank 310, a buffer adjustment tank 320 and a gas retrieving storage tank 330. The first compressed air generating device 210 is in gaseous communication with the compressed air storage tank 310. The second compressed air generating device 220 is in gaseous communication with the compressed air storage tank 310. The buffer adjustment tank 320 is in gaseous communication with the compressed air storage tank 310. The gas retrieving storage tank 330 is in gaseous communication with the second compressed air generating device 220. Accordingly, compressed air with the preset pressure is able to flow into the compressed air storage tank 310 from the first compressed air generating device 210, the second compressed air generating device 220 and the buffer adjustment tank 320, and retrieved compressed air with the pressure less than the preset pressure is able to flow into the second compressed air generating device 220 from the gas retrieving storage tank 330.

As shown in FIGS. 7-8, and 14-18, the gas injection apparatus 400 comprises a second gas injection valve 154, a gas injection adjustment tank 410 and a gas injection device 420. The second gas injection valve 154 is in gaseous communication with the compressed air storage tank 310. The gas injection adjustment tank 410 is in gaseous communication with the second gas injection valve 154. The gas injection device 420 is in gaseous communication with the gas injection adjustment tank 410. The gas injection receiver 145 of each of the plurality of cage devices 140 is configured to be in gaseous communication with the gas injection device 420. The gas injection adjustment tank 410 is in gaseous communication with the buffer adjustment tank 320. The gas injection device 420 comprises at least one gas injection hose reservoir 421, at least one gas injection hose 422, at least one gas injection gun 423, at least one third gas injection valve 155, at least one gas injection gun chute positioner 424, at least one gas injection gun guide channel 425 and at least one gas injection gun positioning ejector 426. The at least one gas injection hose reservoir 421 is in gaseous communication with the gas injection adjustment tank 410. A beginning end of the at least one gas injection hose 422 is in gaseous communication with the at least one gas injection hose reservoir 421. A terminal end of the at least one gas injection hose 422 is in gaseous communication with the at least one gas injection gun 423. The at least one third gas injection valve 155 is disposed within the at least one gas injection gun 423. The at least one gas injection gun chute positioner 424 is disposed on a beginning end of the at least one gas injection gun guide channel 425. The at least one gas injection gun positioning ejector 426 is disposed on a terminal end of the at least one gas injection gun guide channel 425. The at least one gas injection gun 423 enters the at least one gas injection gun guide channel 425 via the at least one gas injection gun chute positioner 424. The at least one gas injection gun 423 reciprocatingly slides within the at least one gas injection gun guide channel 425. The at least one gas injection gun 423 is configured to enter the at least one gas injection gun positioning ejector 426. The at least one gas injection gun 423 is configured to be inserted into the gas injection receiver 145 of each of the plurality of cage devices 140. The at least one gas injection gun 423 is configured to be in gaseous communication with the gas injection receiver 145 of each of the plurality of cage devices 140. The at least one gas injection gun 423 comprises a gas injection gun head 423a, a gas injection gun body 423b and a gas injection gun tail 423c. The gas injection gun body 423b is connected in between the gas injection gun head 423a and the gas injection gun tail 423c. The gas injection gun tail 423c is in gaseous communication with the terminal end of the at least one gas injection hose 422. The gas injection gun head 423a is configured to be in gaseous communication with the gas injection receiver 145 of each of the plurality of cage devices 140. The terminal end of the at least one gas injection gun guide channel 425 comprises a first gas injection gun guide channel 425a, a second gas injection gun guide channel 425b and a gas injection gun guide rail 425c. The gas injection gun guide rail 425c is located in between the first gas injection gun guide channel 425a and the second gas injection gun guide channel 425b. The at least one gas injection gun positioning ejector 426 is disposed in the first gas injection gun guide channel 425a. The at least one gas injection gun positioning ejector 426 comprises a gas injection gun ejecting pneumatic chamber 426a. Accordingly, compressed air with the preset pressure stored in the compressed air storage tank 310 is able to flow into the gas injection adjustment tank 410 and then flow into the gas injection device 420 when the second gas injection valve 154 is open and is then able to flow into the airbag 144 through the at least one gas injection hose reservoir 421, the at least one gas injection hose 422 and the at least one gas injection gun 423 when the at least one gas injection gun 423 is inserted into the gas injection receiver 145, the at least one third gas injection valve 155 opens, and the first gas injection valve 151 opens so as to inflate the airbag 144. Additionally, compressed air with the preset pressure stored in the compressed air storage tank 310 is also able to flow into the gas injection adjustment tank 410 and then into the buffer adjustment tank 320 and then flow back into the compressed air storage tank 310. In one embodiment, there are three gas injection hose reservoirs 421', 421" and 421', three the gas injection hoses 422', 422" and 422', three gas injection guns 423', 423" and 423''', three third gas injection valves 155', 155" and 155', three gas injection gun chute positioners 424', 424" and 424''', three gas injection gun guide channels 425', 425" and 425', and three gas injection gun positioning ejectors 426', 426" and 426'.

As shown in FIGS. 7, 9 and 19-23, the gas retrieving apparatus 500 comprises a second gas retrieving valve 156, a gas retrieving adjustment tank 510 and a gas retrieving device 520. The second gas retrieving valve 156 is in gaseous communication with the gas retrieving storage tank 330. The gas retrieving adjustment tank 510 is in gaseous communication with the second gas retrieving valve 156. The gas retrieving device 520 is in gaseous communication with the gas retrieving adjustment tank 510. The gas retrieving receiver 146 of each of the plurality of cage devices 140 is configured to be in gaseous communication with the gas retrieving device 520. The gas retrieving device 520 comprises at least one gas retrieving hose reservoir 521, at least one gas retrieving hose 522, at least one gas retrieving gun 523, at least one third gas retrieving valve 157, at least one gas retrieving gun chute positioner 524, at least one gas retrieving gun guide channel 525 and at least one gas retrieving gun positioning ejector 526. The at least one gas retrieving hose reservoir 521 is in gaseous communication with the gas retrieving adjustment tank 510. A beginning end of the at least one gas retrieving hose 522 is in gaseous communication with the at least one gas retrieving hose reservoir 521. A terminal end of the at least one gas retrieving hose 522 is in gaseous communication with the at least one gas retrieving gun 523. The at least one third gas retrieving valve 157 is disposed within the at least one gas retrieving gun 523. The at least one gas retrieving gun chute positioner 524 is disposed on a beginning end of the at least one gas retrieving gun guide channel 525. The at least one gas retrieving gun positioning ejector 526 is disposed on a terminal end of the at least one gas retrieving gun guide channel 525. The at least one gas retrieving gun 523 enters the at least one gas retrieving gun guide channel 525 via the at least one gas retrieving gun chute positioner 524. The at least one gas retrieving gun 523 reciprocatingly slides within the at least one gas retrieving gun guide channel 525. The at least one gas retrieving gun 523 is configured to enter the at least one gas retrieving gun positioning ejector 526. The at least one gas retrieving gun 523 is configured to be inserted into the gas retrieving receiver 146 of each of the plurality of cage devices 140. The at least one gas retrieving gun 523 is configured to be in gaseous communication with the gas retrieving receiver 146 of each of the plurality of cage devices 140. The at least one gas retrieving gun 523 comprises a gas retrieving gun head 523a, a gas retrieving gun body 523b and a gas retrieving gun tail 523c. The gas retrieving gun body 523b is connected in between the gas retrieving gun head 523a and the gas retrieving gun tail 523c. The gas retrieving gun tail 523c is in gaseous communication with the terminal end of the at least one gas retrieving hose 522. The gas retrieving gun head 523a is configured to be in gaseous communication with the gas retrieving receiver 146 of each of the plurality of cage devices 140. The terminal end of the at least one gas retrieving gun guide channel 525 comprises a first gas retrieving gun guide channel 525a, a second gas retrieving gun guide channel 525b and a gas retrieving gun guide rail 525c. The gas retrieving gun guide rail 525c is located in between the first gas retrieving gun guide channel 525a and the second gas retrieving gun guide channel 525b. The at least one gas retrieving gun positioning ejector 526 is disposed in the first gas retrieving gun guide channel 525a. The at least one gas retrieving gun positioning ejector 526 comprises a gas retrieving gun ejecting pneumatic chamber 526a. Accordingly, compressed air in the airbag 144 is able to flow into the gas retrieving device 520 through the at least one gas retrieving gun 523, the at least one gas retrieving hose 522 and the at least one gas retrieving hose reservoir 521 and then flow into the gas retrieving adjustment tank 510 when the at least one gas retrieving gun 523 is inserted into the gas retrieving receiver 146, the first gas retrieving valve 152 opens, and the at least one third gas retrieving valve 157 opens so as to deflate the airbag 144 and is then able to flow into the gas retrieving storage tank 330 when the second gas retrieving valve 156 is open such that compressed air in the airbag 144 is retrieved and stored in the gas retrieving storage tank 330. Retrieved compressed air with the pressure less than the preset pressure stored in the gas retrieving storage tank 330 then flows into the compressed air generating device 220. In one embodiment, there are three gas retrieving hose reservoirs 521', 521" and 521''', three gas retrieving hoses 522', 522" and 522''', three the gas retrieving gun 523', 523" and 523', three third gas retrieving valves 157', 157" and 157', three gas retrieving gun chute positioners 524', 524" and 524', three gas retrieving gun guide channels 525', 525" and 525', and three gas retrieving gun positioning ejectors 526', 526" and 526'.

Figure 28:
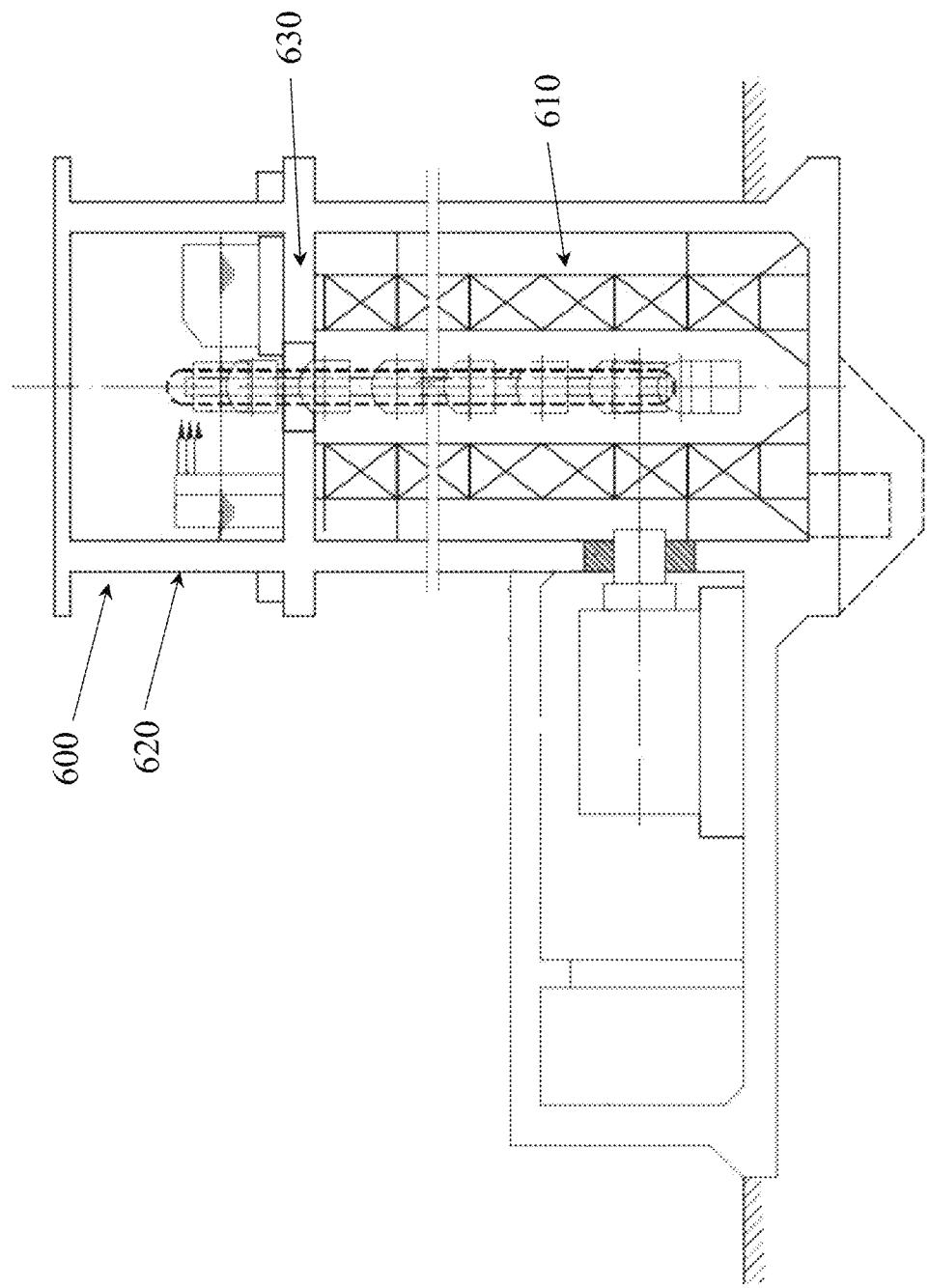
FIG. 28 is a side view showing a majority part of a well positioned aboveground according to the present invention.
Figure 29:
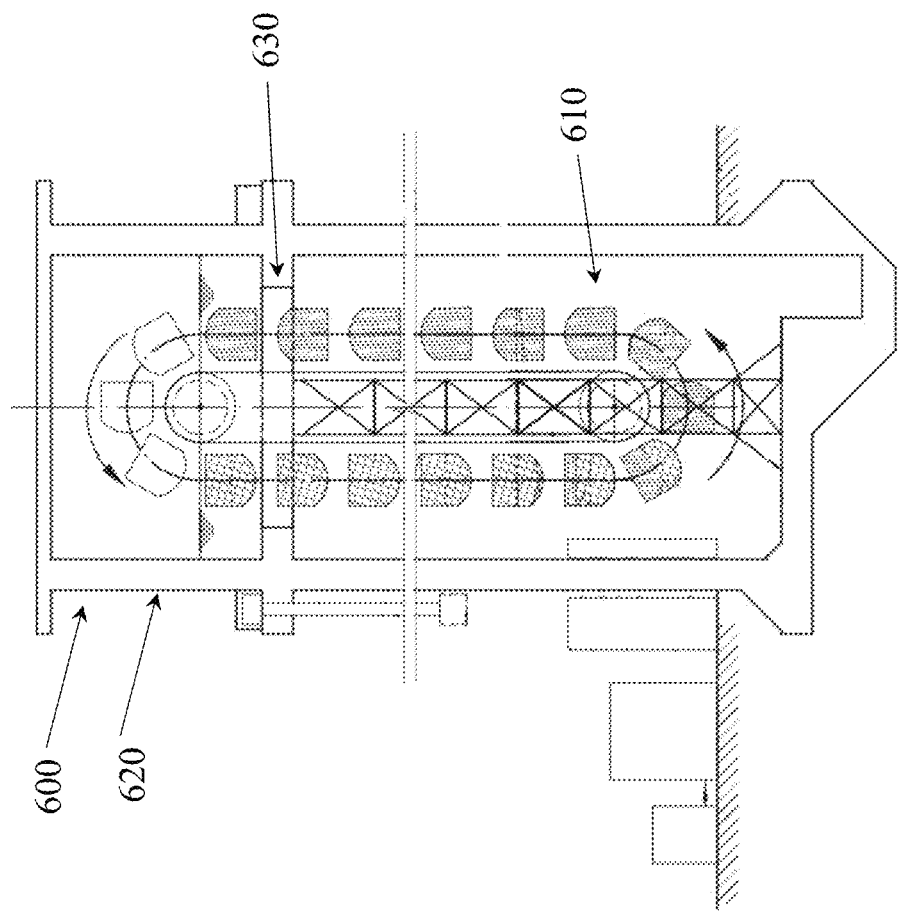
FIG. 29 is a front view showing the majority part of the well positioned aboveground according to the present invention.
Figure 30:
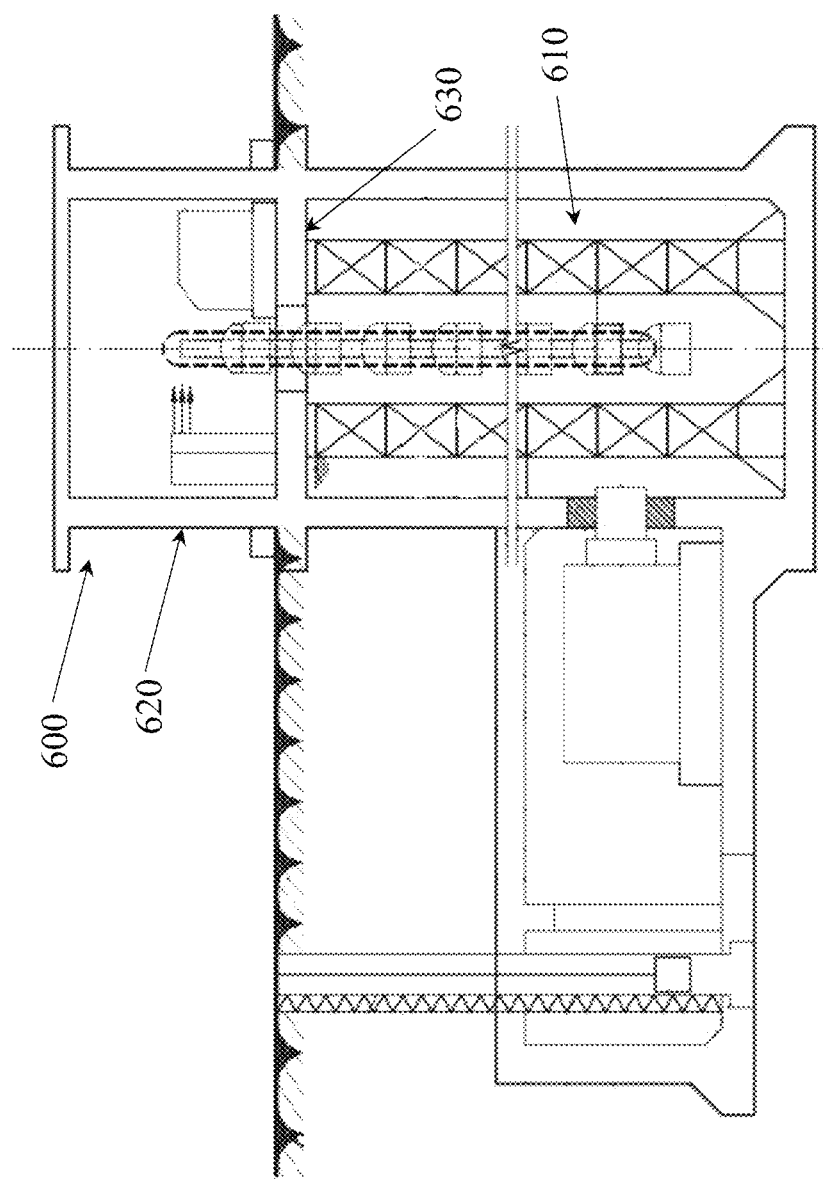
FIG. 30 is a side view showing the majority part of the well positioned underground according to the present invention.
Figure 31:
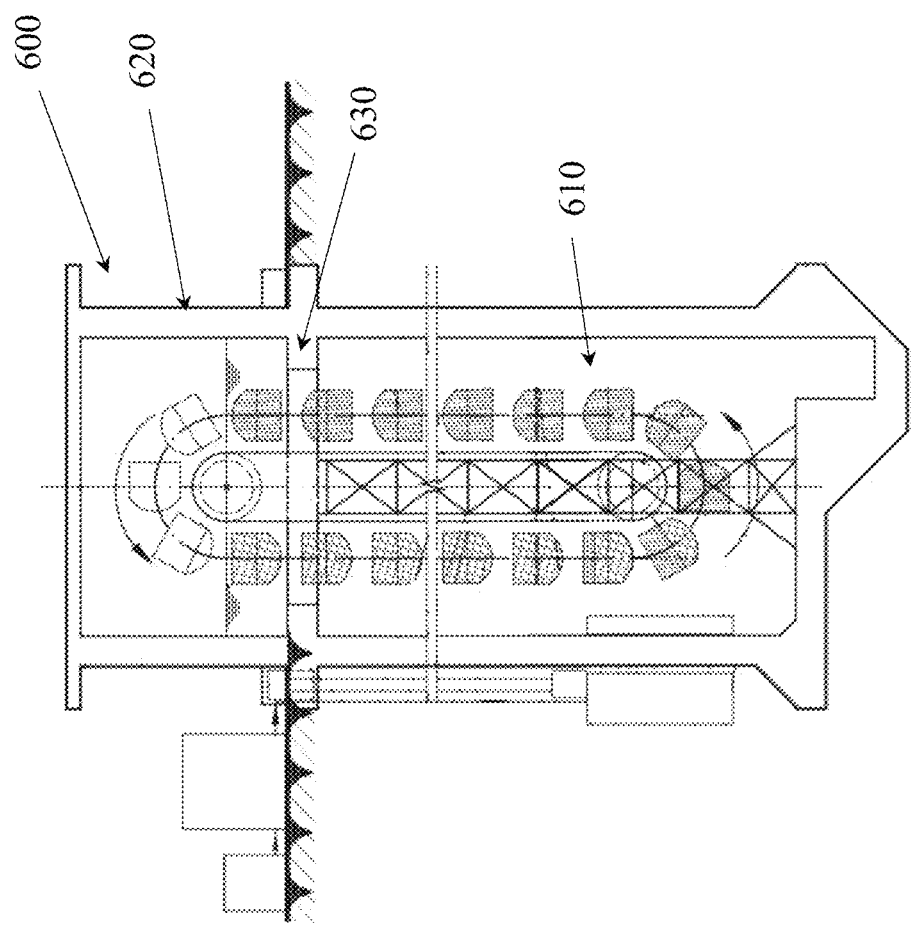
FIG. 31 is a front view showing the majority part of the well positioned underground according to the present invention.
Figure 32:
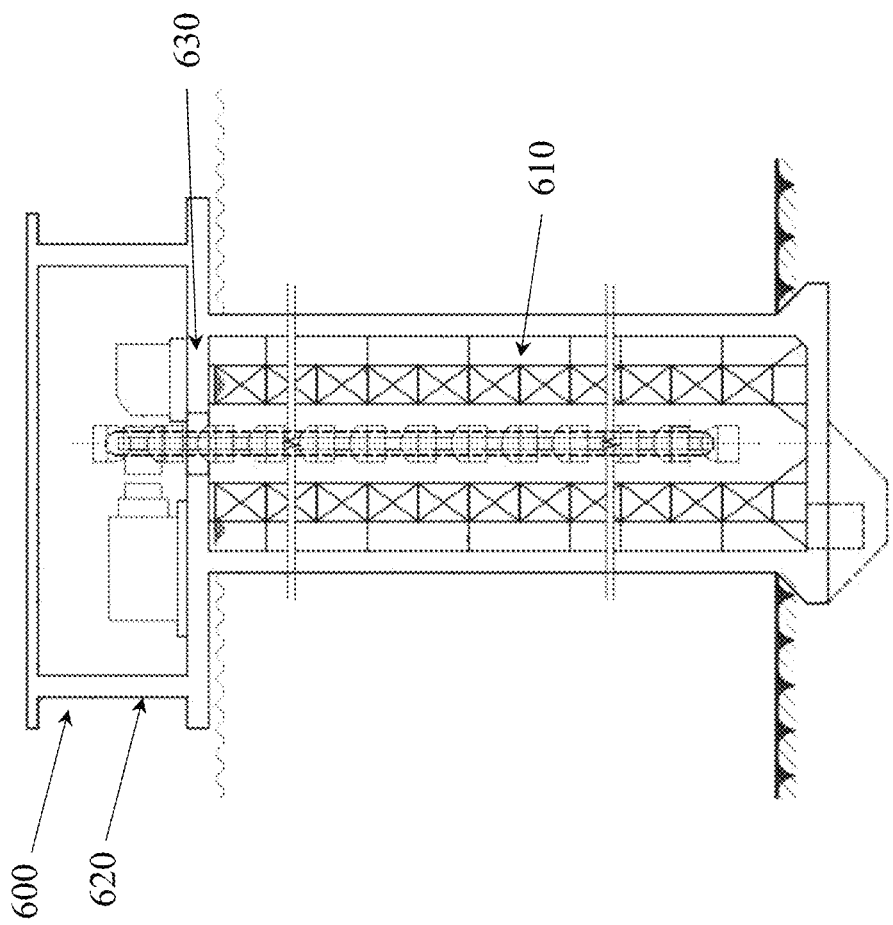
FIG. 32 is a side view showing the majority part of the well positioned below water level according to the present invention.
Figure 33:
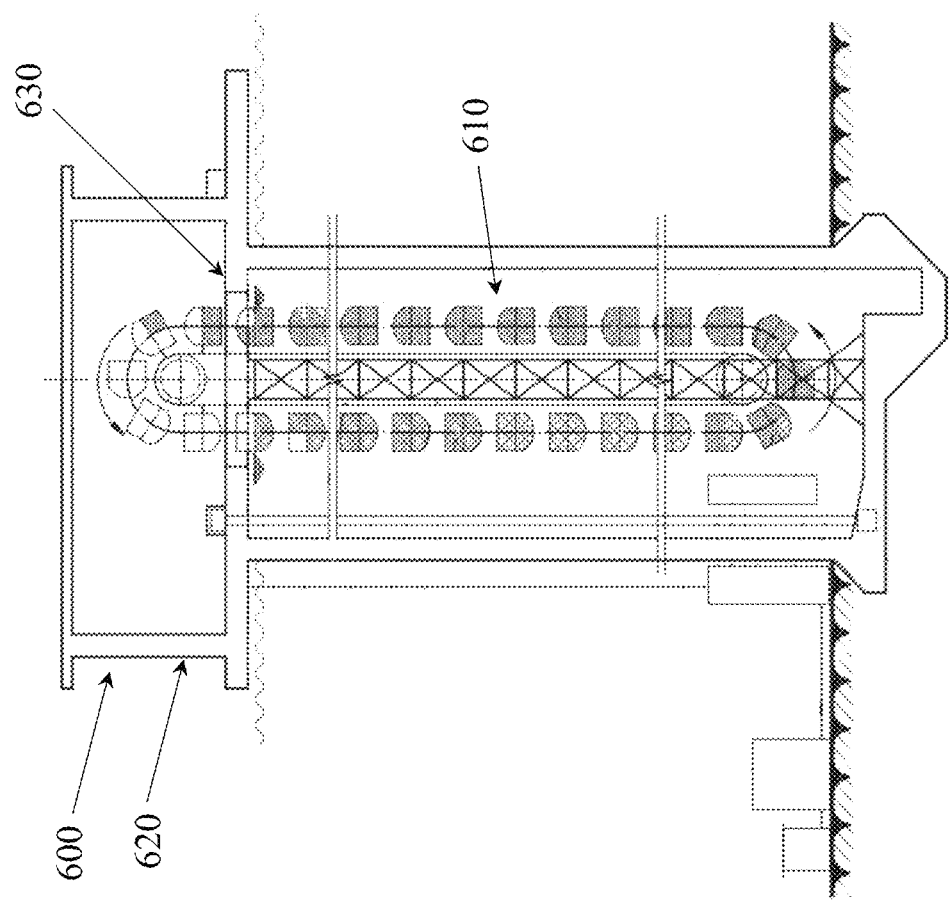
FIG. 33 is a front view showing the majority part of the well positioned below water level according to the present invention.

As shown in FIGS. 28-33, the closed endless rotation cascade cage apparatus 100, the initiation power supply apparatus 700 and the power generating apparatus 800 are mounted to the building 600. The building 600 comprises a well 610, a frame 620 and a working platform 630. The well 610 is configured to store a predetermined amount of water. The well 610 is made of reinforced concrete materials, carbon fiber materials, fiber reinforced plastic materials or engineering plastic materials. A height of the well 610 is not less than 100 M. Preferably, the height of the well 610 is in between 150 M and 250 M. A vertical cross section of the well 610 may be, but not limited to, I-shaped, rectangular, circular or oval. The frame 620 is disposed within the well 610. A lateral portion of the frame 620 is connected with an inner side wall of the well 610. A bottom portion of the frame 620 is connected with an inner bottom wall of the well 610. The frame 620 has a preset strength, rigidity, decay resistance, stability and earthquake resistance. The driving gear 120 is mounted on a lower portion of the frame 620. The driven gear 130 is mounted on an upper portion of the frame 620. The working platform 630 is disposed on an upper portion of the well 610. In one example, a majority part of the well 610 is positioned underground (FIGS. 30-31). In another example, a majority part of the well 610 is positioned aboveground (FIGS. 28-29). In further example, a majority part of the well 610 is positioned below water level (FIGS. 32-33).

As shown in FIGS. 28-33, the initiation power supply apparatus 700 comprises a first driving shaft 710, a first transmission 720, a motor 730 and a power supply device 740. The first driving shaft 710 is configured to be connected with the driven gear 130. The first transmission 720 is connected with the first driving shaft 710. The motor 730 is connected with the first transmission 720. The power supply device 740 is electrically connected with the motor 730. The motor 730 is used to drive the driven gear 130 via the power supply device 740, the first driving shaft 710 and the first transmission 720, such that the driven gear 130 is able to rotate the endless tethering chain device 110. The motor 730 is disposed on the working platform 630. In one example, the initiation power supply apparatus 700 is positioned aboveground. In another example, the initiation power supply apparatus 700 is positioned above water level.

As shown in FIGS. 28-33, the power generating apparatus 800 comprises a second driving shaft 810, a second transmission 820 and a power generator 830. In one embodiment, the second driving shaft 810 is configured to be connected with the driving gear 120. The second transmission 820 is connected with the second driving shaft 810. The power generator 830 is connected with the second transmission 820. The driving gear 120 is used to drive the power generator 830 via the second driving shaft 810 and the second transmission 820, such that the power generator 830 is able to generate power. In another embodiment, the second driving shaft 810 is configured to be connected with the driven gear 130. The second transmission 820 is connected with the second driving shaft 810. The power generator 830 is connected with the second transmission 820. The driven gear 130 is used to drive the power generator 830 via the second driving shaft 810 and the second transmission 820, such that the power generator 830 is able to generate power. In one example, the power generating apparatus 800 is positioned underground. In another example, the power generating apparatus 800 is positioned aboveground. In further example, the power generating apparatus 800 is positioned above water level.

As shown in FIG. 6, the intelligent control apparatus 900 is electrically connected with the closed endless rotation cascade cage apparatus 100, the compressed air generating apparatus 200, the compressed air storage apparatus 300, the gas injection apparatus 400, the gas retrieving apparatus 500, the initiation power supply apparatus 700, the power generating apparatus 800, the safety apparatus 1000, the water treatment apparatus 1100 and the maintenance facility 1200. The intelligent control apparatus 900 is used to collect parameters and information of operation of other devices and apparatus and is further used to control them.

The safety apparatus 1000 comprises an accident warning device, a fire warning device, a security device and a safety exit. The safety apparatus 1000 is used to make alarms and to initiate a security program when an accidence happens.

The water treatment apparatus 1100 comprises a water supply station, a water draining station, a water treatment station, a water supply pipeline, a water draining pipeline and a sludge draining pipeline. The water supply station performs physicochemical and biological treatment of water, then the treated water is poured into the well 610 through the water supply pipeline via the intelligent control apparatus 900. The water draining station guides overflowing water back into the well 610 through the water draining pipeline while draining out wastewater or sludge through the sludge draining pipeline.

The maintenance facility 1200 comprises a warehouse and a service station. The warehouse stores repair parts. The service station performs analysis and maintenance of all apparatus.

As shown in FIGS. 3A-3H, in the beginning, the plurality of cage devices 140 and the endless tethering chain device 110 are in idle states. Then, the the intelligent control apparatus 900 controls the initiation power supply apparatus 700 to drive the driven gear 130 so as to rotate the endless tethering chain device 110. The rotation of the endless tethering chain device 110 in between the driving gear 120 and the driven gear 130 then drives the plurality of cage devices 140 to circulate in the gas injection region 102 and the gas retrieving region 103 such that the cage device 140 moves downwards in the gas injection region 102 and moves upwards in the gas retrieving region 103.

As shown in FIGS. 3A-3H, 7-8 and 14-18, once the cage device 140 enters the gas injection region 102 from the gas retrieving region 103 and sinks into the water stored in the well 610, the the intelligent control apparatus 900 controls the gas injection apparatus 400 to inflate the airbag 144. During an inflation process, the second gas injection valve 154 is open, such that compressed air with the preset pressure stored in the compressed air storage tank 310 flows into the gas injection adjustment tank 13 and then flows into the gas injection device 420; the gas injection gun 423' is ejected from the gas injection gun positioning ejector 426' and is inserted into the gas injection receiver 145 of a cage device 140*a* among the plurality of cage devices 140, the third gas injection valve 155' is open, and the first gas injection valve 151 of the cage device 140*a* is open, such that compressed air flows from the gas injection device 420 into the airbag 144 of the cage device 140*a*; the third gas injection valve 155' is closed, the first gas injection valve 151 of the cage device 140*a* is closed, and the gas injection gun 423' is ejected from the gas injection receiver 145 of the cage device 140*a* and is returned to the gas injection gun positioning ejector 426', when compressed air in the airbag 144 of the cage device 140*a* is at a specific pressure, and the gas injection gun 423" is ejected from the gas injection gun positioning ejector 426" and is inserted into the gas injection receiver 145 of a cage device 140*b* among the plurality of cage devices 140 positioned above the cage device 140*a*, the third gas injection valve 155" is open, and the first gas injection valve 151 of the cage device 140*b* is open, such that compressed air flows from the gas injection device 420 into the airbag 144 of the cage device 140*b*, when compressed air in the airbag 144 of the cage device 140*a* is at one half of the specific pressure; the third gas injection valve 155" is closed, the first gas injection valve 151 of the cage device 140*b* is closed, and the gas injection gun 423" is ejected from the gas injection receiver 145 of the cage device 140*b* and is returned to the gas injection gun positioning ejector 426", when compressed air in the airbag 144 of the cage device 140*b* is at a specific pressure, and the gas injection gun 423''' is ejected from the gas injection gun positioning ejector 426''' and is inserted into the gas injection receiver 145 of a cage device 140*c* among the plurality of cage devices 140 positioned above the cage device 140*b*, the third gas injection valve 155''' is open, and the first gas injection valve 151 of the cage device 140*c* is open, such that compressed air flows from the gas injection device 420 into the airbag 144 of the cage device 140*c*, when compressed air in the airbag 144 of the cage device 140*b* is at one half of the specific pressure; the third gas injection valve 155''' is closed, the first gas injection valve 151 of the cage device 140*c* is closed, and the gas injection gun 423''' is ejected from the gas injection receiver 145 of the cage device 140*c* and is returned to the gas injection gun positioning ejector 426''', when compressed air in the airbag 144 of the cage device 140*c* is at a specific pressure, and the gas injection gun 423' is ejected from the gas injection gun positioning ejector 426' and is inserted into the gas injection receiver 145 of a cage device 140*d* among the plurality of cage devices 140 positioned above the cage device 140*c*, the third gas injection valve 155' is open, and the first gas injection valve 151 of the cage device 140*d* is open, such that compressed air flows from the gas injection device 420 into the airbag 144 of the cage device 140*d*, when compressed air in the airbag 144 of the cage device 140*c* is at one half of the specific pressure; thereafter, a preceding third gas injection valve 155 is closed, the first gas injection valve 151 of a preceding cage device is closed, and a preceding gas injection gun 423 is ejected from the gas injection receiver 145 of the preceding cage device 140 and is returned to a preceding gas injection gun positioning ejector 426, when compressed air in the airbag 144 of the preceding cage device 140 is at a specific pressure, and a subsequent gas injection gun 423 is ejected from a subsequent gas injection gun positioning ejector 426 and is inserted into the gas injection receiver 145 of a subsequent cage device 140 positioned above the preceding cage device 140, a subsequent third gas injection valve 155 is open, and the first gas injection valve 151 of the subsequent cage device 140 is open, such that compressed air flows from the gas injection device 420 into the airbag 144 of the subsequent cage device 140, when compressed air in the airbag 144 of the preceding cage device 140 is at one half of the specific pressure.

As shown in FIGS. 3A-3H, 4A-4D, 8, 10-13 and 28-33, after the inflation process is completed, the airbag 144 enters the gas retrieving region 103 from the gas injection region 102. The airbag 144 which contains compressed air and is immersed in the water stored in the well 610 then thus generates kinetic energy from buoyancy force 1300 (as shown in FIGS. 3A-3H; an operation of the submersible power generating system obtains buoyancy force 1300 according to the Archimedes' principle and the Pascal's principle; the amount of buoyancy force 1300 depends on the weight of the water body discharged by the airbag 144) that is thereafter conveyed to the endless tethering chain device 110 through the airbag 144, the internal cage 143, the intermediate cage 142, the external cage 141 and the connector 148. The driving gear 120 is driven by the the endless tethering chain device 110, such that kinetic energy is transformed into mechanical energy. The power generator 830 then generates power from mechanical energy when the power generator 830 is connected with the second transmission 820 of the power generating apparatus 800, the second transmission 820 of the power generating apparatus 800 is connected with the second driving shaft 810 of the power generating apparatus 800 and the second driving shaft 810 of the power generating apparatus 800 is connected with the driving gear 120.

As shown in FIGS. 3A-3H, in an embodiment, in the beginning, the plurality of cage devices 140 and the endless tethering chain device 110 are in idle states, and the plurality of cage devices 140 and the endless tethering chain device 110 are in the force balance. Then, the initiation power supply apparatus 700 drives the driven gear 130 so as to rotate the endless tethering chain device 110 and thus to drive the plurality of cage devices 140 to circulate in the gas injection region 102 and the gas retrieving region 103. Thereafter, a first cage device among the plurality of cage devices 140 obtains buoyancy force 1300 during the inflation process and then enters the gas retrieving region 103 from the gas injection region 102 so as to generate kinetic energy from buoyancy force 1300, a second cage device among the plurality of cage devices 140 obtains buoyancy force 1300 during the inflation process and then enters the gas retrieving region 103 from the gas injection region 102 so as to generate kinetic energy from buoyancy force 1300, a third cage device among the plurality of cage devices 140 obtains buoyancy force 1300 during the inflation process and then enters the gas retrieving region 103 from the gas injection region 102 so as to generate kinetic energy from buoyancy force 1300, a fourth cage device among the plurality of cage devices 140 obtains buoyancy force 1300 during the inflation process and then enters the gas retrieving region 103 from the gas injection region 102 so as to generate kinetic energy from buoyancy force 1300, a fifth cage device among the plurality of cage devices 140 obtains buoyancy force 1300 during the inflation process and then enters the gas retrieving region 103 from the gas injection region 102 so as to generate kinetic energy from buoyancy force 1300, a sixth cage device among the plurality of cage devices 140 obtains buoyancy force 1300 during the inflation process and then enters the gas retrieving region 103 from the gas injection region 102 so as to generate kinetic energy from buoyancy force 1300, . . . , and a $n^{th}$ cage device among the plurality of cage devices 140 obtains buoyancy force 1300 during the inflation process and then enters the gas retrieving region 103 from the gas injection region 102 so as to generate kinetic energy from buoyancy force 1300.

As shown in FIGS. 4A-4D, in an embodiment, based on the first law of energy balance, there is no loss under an ideal circumstance, electrical energy is converted into pressure energy via compressed air, and pressure energy is converted into electrical energy by the submersible power generating system of the present invention. When the submersible power generating system is operated under the ideal circumstance, energy input and energy output are equal to each other, as shown in the bar charts. In the industrial production process, due to a certain loss, energy input is greater than energy output (input=output+loss) based on the first law of energy balance. The submersible power generating system of the present invention gradually replaces compressed air with the preset pressure by retrieved compressed air via the expansion function of "entropy." As shown in the histogram, "initial energy+retrieved energy"="loss energy+energy production." Once the "retrieved energy" is increased, it will inevitably lead to a decrease in the "initial energy."

As shown in FIGS. 3A-3H, 4A-4D, 7, 9, and 19-23, once the cage device 140 enters the gas retrieving region 103 from the gas injection region 102, the intelligent control apparatus 900 controls the gas retrieving apparatus 500 to deflate the airbag 144. During a deflation process, the second gas retrieving valve 156 is open, such that compressed air is able to flow from the gas retrieving device 520 into the gas retrieving adjustment tank 510 and then into the gas retrieving storage tank 330; in each stage of three stages, the gas retrieving gun 523' is ejected from the gas retrieving gun positioning ejector 526' and is inserted into the gas retrieving receiver 146 of the cage device 140a among the plurality of cage devices 140, the third gas retrieving valve 157' is open, and the first gas retrieving valve 152 of the cage device 140a is open, such that compressed air flows from the airbag 144 of the cage device 140a into the gas retrieving device 520; the third gas retrieving valve 157' is closed, the first gas retrieving valve 152 of the cage device 140a is closed, and the gas retrieving gun 523' is ejected from the gas retrieving receiver 146 of the cage device 140a and is returned to the gas retrieving gun positioning ejector 526', when 40% of compressed air in the airbag 144 of the cage device 140a is retrieved into the gas retrieving device 520; the gas retrieving gun 523" is ejected from the gas retrieving gun positioning ejector 526" and is inserted into the gas retrieving receiver 146 of the cage device 140b among the plurality of cage devices 140 positioned below the cage device 140a, the third gas retrieving valve 157" is open, and the first gas retrieving valve 152 of the cage device 140b is open, such that compressed air flows from the airbag 144 of the cage device 140b into the gas retrieving device 520, when 40% of compressed air in the airbag 144 of the cage device 140a is retrieved into the gas retrieving device 520; the third gas retrieving valve 157" is closed, the first gas retrieving valve 152 of the cage device 140b is closed, and the gas retrieving gun 523" is ejected from the gas retrieving receiver 146 of the cage device 140b and is returned to the gas retrieving gun positioning ejector 526", when 40% of compressed air in the airbag 144 of the cage device 140b is retrieved into the gas retrieving device 520; the gas retrieving gun 523''' is ejected from the gas retrieving gun positioning ejector 526''' and is inserted into the gas retrieving receiver 146 of the cage device 140c among the plurality of cage devices 140 positioned below the cage device 140b, the third gas retrieving valve 157' is open, and the first gas retrieving valve 152 of the cage device 140c is open, such that compressed air flows from the airbag 144 of the cage device 140c into the gas retrieving device 520, when 40% of compressed air in the airbag 144 of the cage device 140b is retrieved into the gas retrieving device 520; the third gas retrieving valve 157' is closed, the first gas retrieving valve 152 of the cage device 140c is closed, and the gas retrieving gun 523' is ejected from the gas retrieving receiver 146 of the cage device 140c and is returned to the gas retrieving gun positioning ejector 526', when 40% of compressed air in the airbag 144 of the cage device 140c is retrieved into the gas retrieving device 520; thereafter, a subsequent the gas retrieving gun 523 is ejected from a subsequent gas retrieving gun positioning ejector 526 and is inserted into the gas retrieving receiver 146 of a subsequent cage device 140 positioned below a preceding cage device 140, a subsequent third gas retrieving valve is open, and the first gas retrieving valve 152 of the subsequent cage device 140 is open, such that compressed air flows from the airbag 144 of the subsequent cage device 140 into the gas retrieving device 520, when 40% of compressed air in the airbag 144 of the preceding cage device 140 is retrieved into the gas retrieving device 520; the subsequent third gas retrieving valve 157 is closed, the first gas retrieving valve 152 of the subsequent cage device 140 is closed, and the subsequent gas retrieving gun 523 is ejected from the gas retrieving receiver 146 of the subsequent cage device 140 and is returned to the subsequent gas retrieving gun positioning ejector 526, when 40% of compressed air in the airbag 144 of the subsequent cage device 140 is retrieved into the gas retrieving device 520.

As shown in FIGS. 2, 3A-3H, 4A-4D and 5A-5C, in the first stage, 40% of total compressed air in the airbag 144 is retrieved. In the second stage, 40% of remaining compressed air in the airbag 144 is retrieved. In the third stage, 40% of further remaining compressed air in the airbag 144 is retrieved. After the three stages, the amount of the total retrieved compressed air is more than 75%. After all the three stages have been completed, 21.6% of compressed air in the airbag 144 hasn't been retrieved. Before the airbag 144 emerges from the water stored in the well 610, the intelligent control apparatus 900 opens the gas release valve 153, such that most of compressed air in the airbag 144 that hasn't been retrieved is exhausted into the water stored in the well 610 and thus facilitate the airbag 144 to emerge from the water stored in the well 610 via the exhaustion. Then, the remainder of compressed air in the airbag 144 is completely exhausted, such that the water body is able to instantly influx around the airbag 144, thereby reducing resistance when the cage device 140 sinks, and then the airbag 144 is ready for re-entering the gas injection region 102 and re-sinking into the water stored in the well 610.

FIGS. 5A-5C show that compressed air and pressure energy are retrieved by the submersible power generating system. In each stage of the three stages, 40% of compressed air currently stored in the airbag 144 is retrieved. In an embodiment, remaining compressed air stored in the airbag 144 is 0.6 $XM^3$, 0.36 $XM^3$ and 0.216 $XM^3$ respectively, remaining pressure in the airbag 144 is 0.6 Xkg, 0.36 Xkg and 0.216 Xkg respectively, total retrieved compressed air is 0.784 $XM^3$ (0.4 $XM^3$+0.24 $XM^3$+0.144 $XM^3$), the final remaining compressed air in the airbag 144 is 0.216 $XM^3$, total retrieved pressure energy is 0.784 Pkg (0.4 Pkg+0.24 Pkg+0.144 Pkg), and the final remaining pressure energy in the airbag 144 is 0.216 Pkg.

Although the invention has been explained in relation to its preferred embodiment, it is to be understood that many other possible modifications and variations can be made without departing from the spirit and scope of the invention as hereinafter claimed.

What is claimed is:

1. A power generating system comprising:
a closed endless rotation cascade cage apparatus;
a compressed air generating apparatus;
a compressed air storage apparatus;
a gas injection apparatus;
a gas retrieving apparatus;
a building;
an initiation power supply apparatus;
a power generating apparatus;
an intelligent control apparatus;
the intelligent control apparatus being electrically connected with the closed endless rotation cascade cage apparatus, the compressed air generating apparatus, the compressed air storage apparatus, the gas injection apparatus, the gas retrieving apparatus, the initiation power supply apparatus and the power generating apparatus;
the closed endless rotation cascade cage apparatus, the initiation power supply apparatus and the power generating apparatus being mounted to the building;
the compressed air generating apparatus comprising a first compressed air generating device and a second compressed air generating device;
the compressed air storage apparatus comprising a compressed air storage tank, a buffer adjustment tank and a gas retrieving storage tank;
the first compressed air generating device being in gaseous communication with the compressed air storage tank;
the second compressed air generating device being in gaseous communication with the compressed air storage tank;
the buffer adjustment tank being in gaseous communication with the compressed air storage tank; and
the gas retrieving storage tank being in gaseous communication with the second compressed air generating device.

2. The power generating system of claim 1 comprising:
a safety apparatus;
a water treatment apparatus;
a maintenance facility; and
the intelligent control apparatus being electrically connected with the safety apparatus, the water treatment apparatus and the maintenance facility.

3. The power generating system of claim 1 comprising:
the closed endless rotation cascade cage apparatus comprising a sagittal plane, a gas injection region, a gas retrieving region, an endless tethering chain device, a driving gear, a driven gear and a plurality of cage devices;
the gas injection region and the gas retrieving region being divided by the sagittal plane;
the endless tethering chain device extending along the sagittal plane;
the endless tethering chain device being distributed in the gas injection region and the gas retrieving region;
the driving gear being positioned on the sagittal plane;
the driven gear being positioned on the sagittal plane;
the endless tethering chain device being rotatably connected in between the driving gear and the driven gear;
the plurality of cage devices being connected with the endless tethering chain device in series; and
the plurality of cage devices circulating in the gas injection region and the gas retrieving region in response to the endless tethering chain device being rotated in between the driving gear and the driven gear.

4. The power generating system of claim 3 comprising:
each of the plurality of cage devices comprising an external cage, an intermediate cage, an internal cage, an airbag, a gas injection receiver, a first gas injection valve, a gas retrieving receiver, a first gas retrieving valve, a gas release valve, a cover and a connector, the intermediate cage being accommodated within the external cage, the internal cage being accommodated within the intermediate cage, the airbag being accommodated within the internal cage, the gas injection receiver being connected with the airbag, the gas injection receiver being in gaseous communication with the airbag, the first gas injection valve being disposed within the gas injection receiver, the gas retrieving receiver being connected with the airbag, the gas retrieving receiver being in gaseous communication with the airbag, the first gas retrieving valve being disposed within the gas retrieving receiver, the gas release valve being connected with the airbag, the gas release valve being in gaseous communication with the airbag, the cover being connected with the external cage, the gas release valve and the cover being oppositely located to each other, the connector being connected with the external cage, the external cage being connected with the endless tethering chain device via the connector.

5. The power generating system of claim 4 comprising:
the cover having a streamline shape.

6. The power generating system of claim 3 comprising:
each of the external cage, the intermediate cage and the internal cage comprising a cage body, a cage chamber and a plurality of cage holes, the cage chamber being formed within the cage body, the plurality of cage holes traversing into the cage body, the plurality of cage holes being communicated with the cage chamber.

7. The power generating system of claim 6 comprising:
each of the plurality of holes of the external cage being larger than each of the plurality of holes of the intermediate cage; and
each of the plurality of holes of the intermediate cage being larger than each of the plurality of holes of the internal cage.

8. The power generating system of claim 3 comprising:
the endless tethering chain device comprising a first tethering chain, a second tethering chain and a plurality of rigid links;
each of the plurality of rigid links being connected in between the first tethering chain and the second tethering chain; and
each of the plurality of rigid links being engaged with gear teeth of the driving gear and gear teeth of the driven gear.

9. The power generating system of claim 1 comprising:
the gas injection apparatus comprising a second gas injection valve, a gas injection adjustment tank and a gas injection device;
the second gas injection valve being in gaseous communication with the compressed air storage tank;
the gas injection adjustment tank being in gaseous communication with the second gas injection valve;
the gas injection device being in gaseous communication with the gas injection adjustment tank;
a gas injection receiver of each of a plurality of cage devices of the closed endless rotation cascade cage apparatus being configured to be in gaseous communication with the gas injection device; and
the gas injection adjustment tank being in gaseous communication with the buffer adjustment tank.

10. The power generating system of claim 9 comprising:
the gas injection device comprising at least one gas injection hose reservoir, at least one gas injection hose, at least one gas injection gun, at least one third gas injection valve, at least one gas injection gun chute positioner, at least one gas injection gun guide channel and at least one gas injection gun positioning ejector;
the at least one gas injection hose reservoir being in gaseous communication with the gas injection adjustment tank;
the at least one gas injection hose being in gaseous communication with the at least one gas injection hose reservoir;
the at least one gas injection hose being in gaseous communication with the at least one gas injection gun;
the at least one third gas injection valve being disposed within the at least one gas injection gun;
the at least one gas injection gun chute positioner being disposed on the at least one gas injection gun guide channel;
the at least one gas injection gun positioning ejector being disposed on the at least one gas injection gun guide channel;
the at least one gas injection gun entering the at least one gas injection gun guide channel via the at least one gas injection gun chute positioner;
the at least one gas injection gun reciprocatingly sliding within the at least one gas injection gun guide channel;
the at least one gas injection gun being configured to enter the at least one gas injection gun positioning ejector;
the at least one gas injection gun being configured to be inserted into the gas injection receiver of each of the plurality of cage devices; and
the at least one gas injection gun being configured to be in gaseous communication with the gas injection receiver of each of the plurality of cage devices.

11. The power generating system of claim 10 comprising:
the at least one gas injection gun comprising a gas injection gun head, a gas injection gun body and a gas injection gun tail;
the gas injection gun body being connected in between the gas injection gun head and the gas injection gun tail;
the gas injection gun tail being in gaseous communication with the at least one gas injection hose; and
the gas injection gun head being configured to be in gaseous communication with the gas injection receiver of each of the plurality of cage devices.

12. The power generating system of claim 10 comprising:
the at least one gas injection gun guide channel comprising a first gas injection gun guide channel, a second gas injection gun guide channel and a gas injection gun guide rail;
the gas injection gun guide rail being located in between the first gas injection gun guide channel and the second gas injection gun guide channel; and
the at least one gas injection gun positioning ejector being disposed in the first gas injection gun guide channel.

13. The power generating system of claim 1 comprising:
the gas retrieving apparatus comprising a second gas retrieving valve, a gas retrieving adjustment tank and a gas retrieving device;
the second gas retrieving valve being in gaseous communication with the gas retrieving storage tank;
the gas retrieving adjustment tank being in gaseous communication with the second gas retrieving valve;
the gas retrieving device being in gaseous communication with the gas retrieving adjustment tank; and
a gas retrieving receiver of each of a plurality of cage devices of the closed endless rotation cascade cage apparatus being configured to be in gaseous communication with the gas retrieving device.

14. The power generating system of claim 13 comprising:
the gas retrieving device comprising at least one gas retrieving hose reservoir, at least one gas retrieving hose, at least one gas retrieving gun, at least one third gas retrieving valve, at least one gas retrieving gun chute positioner, at least one gas retrieving gun guide channel and at least one gas retrieving gun positioning ejector;
the at least one gas retrieving hose reservoir being in gaseous communication with the gas retrieving adjustment tank;
the at least one gas retrieving hose being in gaseous communication with the at least one gas retrieving hose reservoir;
the at least one gas retrieving hose being in gaseous communication with the at least one gas retrieving gun;
the at least one third gas retrieving valve being disposed within the at least one gas retrieving gun;

the at least one gas retrieving gun chute positioner being disposed on the at least one gas retrieving gun guide channel;

the at least one gas retrieving gun positioning ejector being disposed on the at least one gas retrieving gun guide channel;

the at least one gas retrieving gun entering the at least one gas retrieving gun guide channel via the at least one gas retrieving gun chute positioner;

the at least one gas retrieving gun reciprocatingly sliding within the at least one gas retrieving gun guide channel;

the at least one gas retrieving gun being configured to enter the at least one gas retrieving gun positioning ejector;

the at least one gas retrieving gun being configured to be inserted into the gas retrieving receiver of each of the plurality of cage devices; and the at least one gas retrieving gun being configured to be in gaseous communication with the gas retrieving receiver of each of the plurality of cage devices.

15. The power generating system of claim 14 comprising:

the at least one gas retrieving gun comprising a gas retrieving gun head, a gas retrieving gun body and a gas retrieving gun tail;

the gas retrieving gun body being connected in between the gas retrieving gun head and the gas retrieving gun tail;

the gas retrieving gun tail being in gaseous communication with the at least one gas retrieving hose; and the gas retrieving gun head being configured to be in gaseous communication with the gas retrieving receiver of each of the plurality of cage devices.

16. The power generating system of claim 14 comprising:

the at least one gas retrieving gun guide channel comprising a first gas retrieving gun guide channel, a second gas retrieving gun guide channel and a gas retrieving gun guide rail;

the gas retrieving gun guide rail being located in between the first gas retrieving gun guide channel and the second gas retrieving gun guide channel; and the at least one gas retrieving gun positioning ejector being disposed in the first gas retrieving gun guide channel.

17. The power generating system of claim 1 comprising:

the building comprising a well and a frame;

the frame being disposed within the well;

a driving gear of the closed endless rotation cascade cage apparatus being mounted on the frame; and a driven gear of the closed endless rotation cascade cage apparatus being mounted on the frame.

18. The power generating system of claim 1 comprising:

the initiation power supply apparatus comprising a first driving shaft, a first transmission, a motor and a power supply device;

the first driving shaft being configured to be connected with a driven gear of the closed endless rotation cascade cage apparatus;

the first transmission being connected with the first driving shaft;

the motor being connected with the first transmission;

the power supply device being electrically connected with the motor; and the motor being used to drive the driven gear via the power supply device, the first driving shaft and the first transmission, such that the driven gear is able to rotate the endless tethering chain device.

19. The power generating system of claim 1 comprising:

the power generating apparatus comprising a second driving shaft, a second transmission and a power generator;

the second driving shaft being configured to be connected with a driving gear of the closed endless rotation cascade cage apparatus;

the second transmission being connected with the second driving shaft;

the power generator being connected with the second transmission; and the driving gear being used to drive the power generator via the second driving shaft and the second transmission, such that the power generator is able to generate power.

* * * * *